United States Patent [19]

Speckhard

[11] 4,074,067
[45] Feb. 14, 1978

[54] DIGITAL PRINTOUT ARRANGEMENT WITH MAGNETIC FIELD CARRIAGE DRIVE

[76] Inventor: Arthur Speckhard, 1617 Granvia Altamira, Palos Verdes Estates, Calif. 90274

[21] Appl. No.: 699,623

[22] Filed: June 25, 1976

[51] Int. Cl.² .......................... B41J 5/30; H04L 15/00
[52] U.S. Cl. ................................ 178/23 R; 197/1 R; 197/19; 364/200
[58] Field of Search .......................... 178/23 R, 25, 30; 340/172.5; 197/1 R, 19, 12; 318/569

[56] References Cited

U.S. PATENT DOCUMENTS

| | | | |
|---|---|---|---|
| 3,703,949 | 11/1972 | Howard et al. | 197/1 R |
| 3,872,959 | 3/1975 | Wang et al. | 197/19 |
| 3,970,183 | 7/1976 | Robinson et al. | 197/1 R |

OTHER PUBLICATIONS

"DEC Printer," advertisement for Digital Equip't. Corp., printer LA180, found in *Computer Design* for May 1976, pertinent pages 51–55.

*Primary Examiner*—Thomas A. Robinson
*Attorney, Agent, or Firm*—Don B. Finkelstein

[57] ABSTRACT

A digital printout arrangement to print out a predetermined character response to a known coded input signal. The printout arrangement has a rotatably moveable platen for moving the medium upon which the printing is to occur in both forward and reverse directions. A printhead, which may be of the dot matrix type, is mounted on a carriage that moves reciprocatingly adjacent the platen. An incremental print ribbon is intermediate the platen and printhead to allow printing on the medium in response to activation of the dot printers in the printhead. The platen, printhead and print ribbon are digitally moved in response to digital control signals. A microprocessor, which comprises, essentially, a mini, special purpose computer is provided and has a storage means, a memory means and logic for generating the digital control signals in response to known input signals. The input signal may, for example, be of the serial by bit coded type and is converted into a parallel by character coded signal. The microprocessor generates the appropriate signals for control of the various components. Position sensing means for detecting the position of various components may also be provided. The microprocessor may store in a memory various programs for specific responses to the known input signal. The carriage drive means is preferably of the linear induction motor type and the carriage is free of direct mechanical interconnection to the carriage drive means.

18 Claims, 23 Drawing Figures

```
  7 6 5 4 3 2 1 0
 ┌─────┬─────────┐
 │  OP │         │
 ├──┬──┤    A    │   INSTRUCTION FORMAT
 │Y │X │         │
 └──┴──┴─────────┘
```

Y=0   X=0   LOAD            ⎫
      1     LOAD IMMED.     ⎪  ARITHMETIC, LOGICAL
      2     ADD    —"—      ⎪     ON DATA MOVEMENT
      3     SUB    —"—      ⎬        FUNCTIONS
      4     AND    —"—      ⎪
      5     OR     —"—      ⎪
      6     XOR    —"—      ⎪
      7                     ⎭

LOAD  A=0   GEN. REG. 1
      1     —"—  —"— 2
      2     —"—  —"— 3
      3     —"—  —"— 4
      4     KEYBOARD LOWER (3-0)
      5     —"———"— UPPER (7-4)
      6     COMM. REG. LOWER (3-0)
      7     —"—  —"— UPPER (7-4)
      10    STATUS #1 (KEYBOARD, TIMER, MARGIN, COMM.)
      11    —"—  #2 (CARRIAGE STATUS, PLATEN STATUS,
                     XLATE STATUS, COMM. STATUS.)
      12    —"—  #3 (ESCAPE, HERE-IS. REPEAT. No)
      13    —"—  #4 (LATCH #1 LATCH #2 LATCH #3
                     FORM STATUS)
      14
      15
      16    PLATEN REGISTER
      17    CARRIAGE REGISTER

FIG. 2A

Y=1   X=0   TRANS. ANY BIT
      1     —"—    NO BIT
      2     —"—    NOT LESS THAN
      3     —"—    NOT GREATER THAN
      4     —"—    EQUAL
      5     —"—    NOT EQUAL
      6     STORE
      7     ACT

FIG. 2B

| | | |
|---|---|---|
| STORE | A = 0 | GEN. REG. 1 |
| | 1 | —··— —··— 2 |
| | 2 | —··— —··— 3 |
| | 3 | —··— —··— 4 |
| | 4 | PRINT REG. LOWER (3-0) |
| | 5 | —··— —··— UPPER (7-4) |
| | 6 | COMM. REG. LOWER (3-0) |
| | 7 | —··— —··— UPPER (7-4) |
| | 10 | SET LATCH #1 |
| | 11 | RESET LATCH #1 |
| | 12 | SET LATCH #2 |
| | 13 | RESET LATCH #2 |
| | 14 | SET LATCH #3 |
| | 15 | RESET LATCH #3 |
| | 16 | PLATEN REGISTER |
| | 17 | CARRIAGE REGISTER |

FIG. 2c

| | | |
|---|---|---|
| ACT | A = 0 | KEYBOARD LATCH RESET |
| | 1 | TIMER LATCH RESET |
| | 2 | COMM. LATCH RESET |
| | 3 | MARGIN LATCH RESET |
| | 4 | SET CARRIAGE FORWARD |
| | 5 | SET CARRIAGE BACKWARD |
| | 6 | SET PLATEN FORWARD |
| | 7 | SET PLATEN BACKWARD |
| | 10 | SET XLATE PRINTING |
| | 11 | SET DIRECT PRINTING |
| | 12 | PRINT |
| | 13 | RIBBON FEED |
| | 14 | COMM. START |
| | 15 | XLATE COUNTER RESET |
| | 16 | LINK |
| | 17 | RETURN |

FIG. 2D

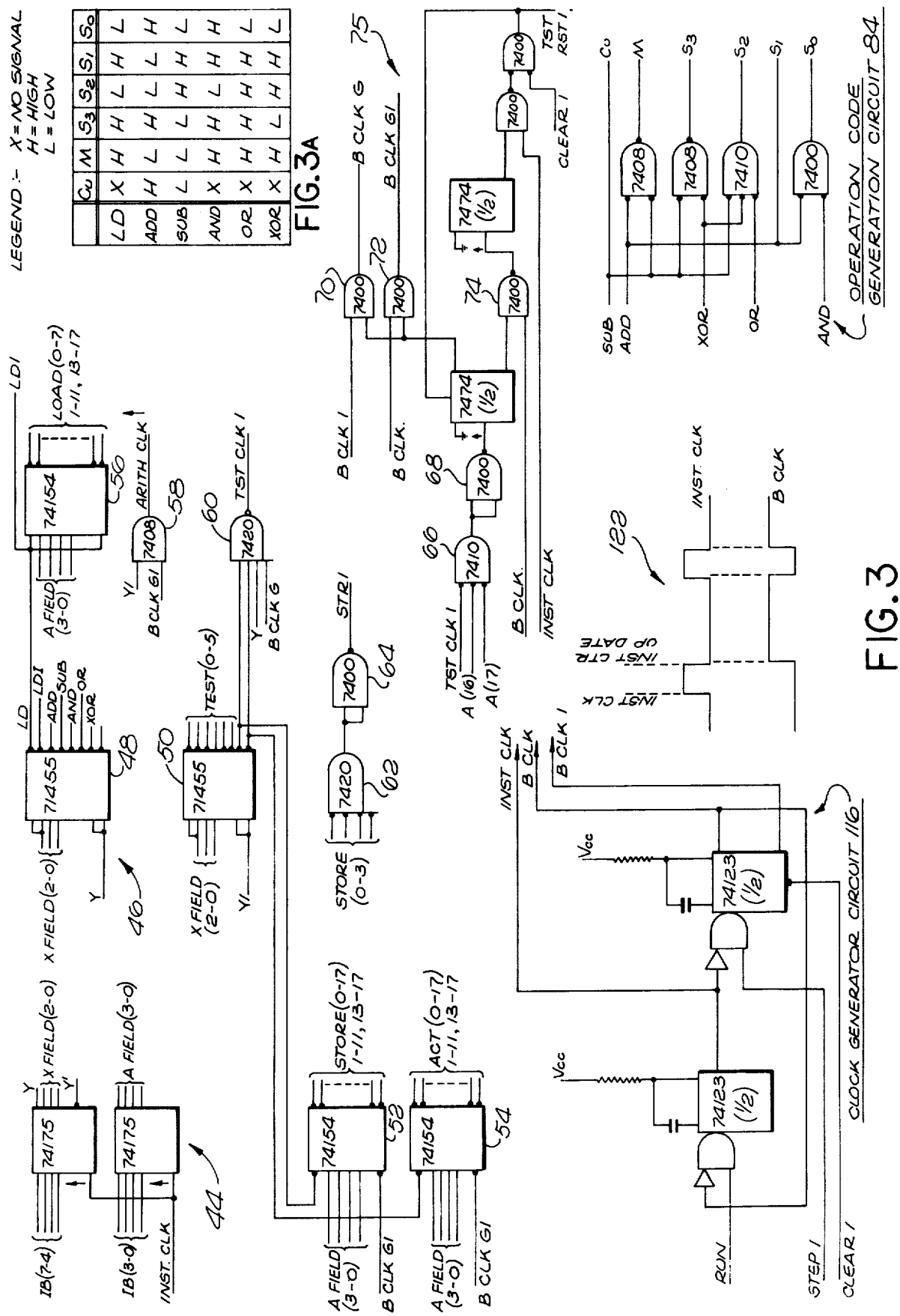

FIG. 6B

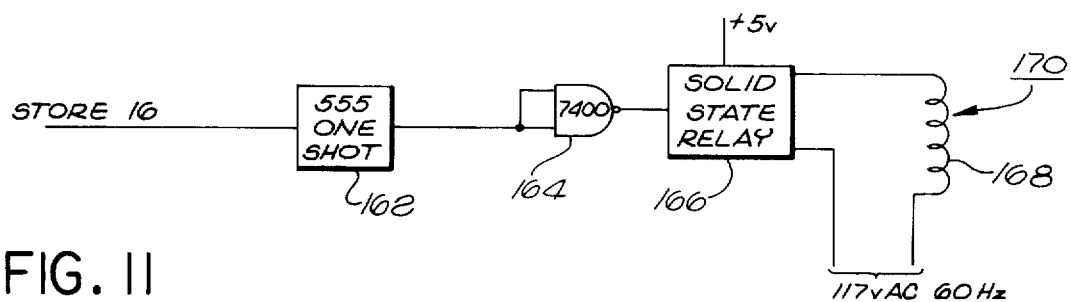
FIG. 11
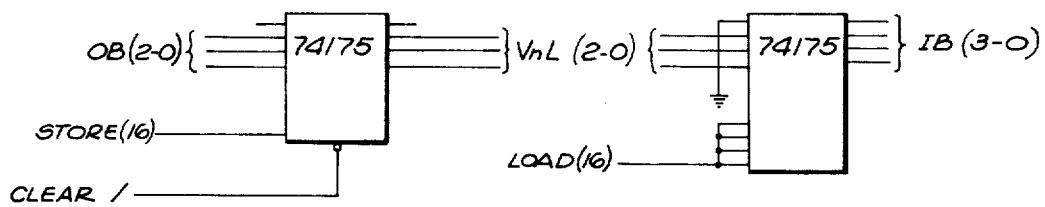
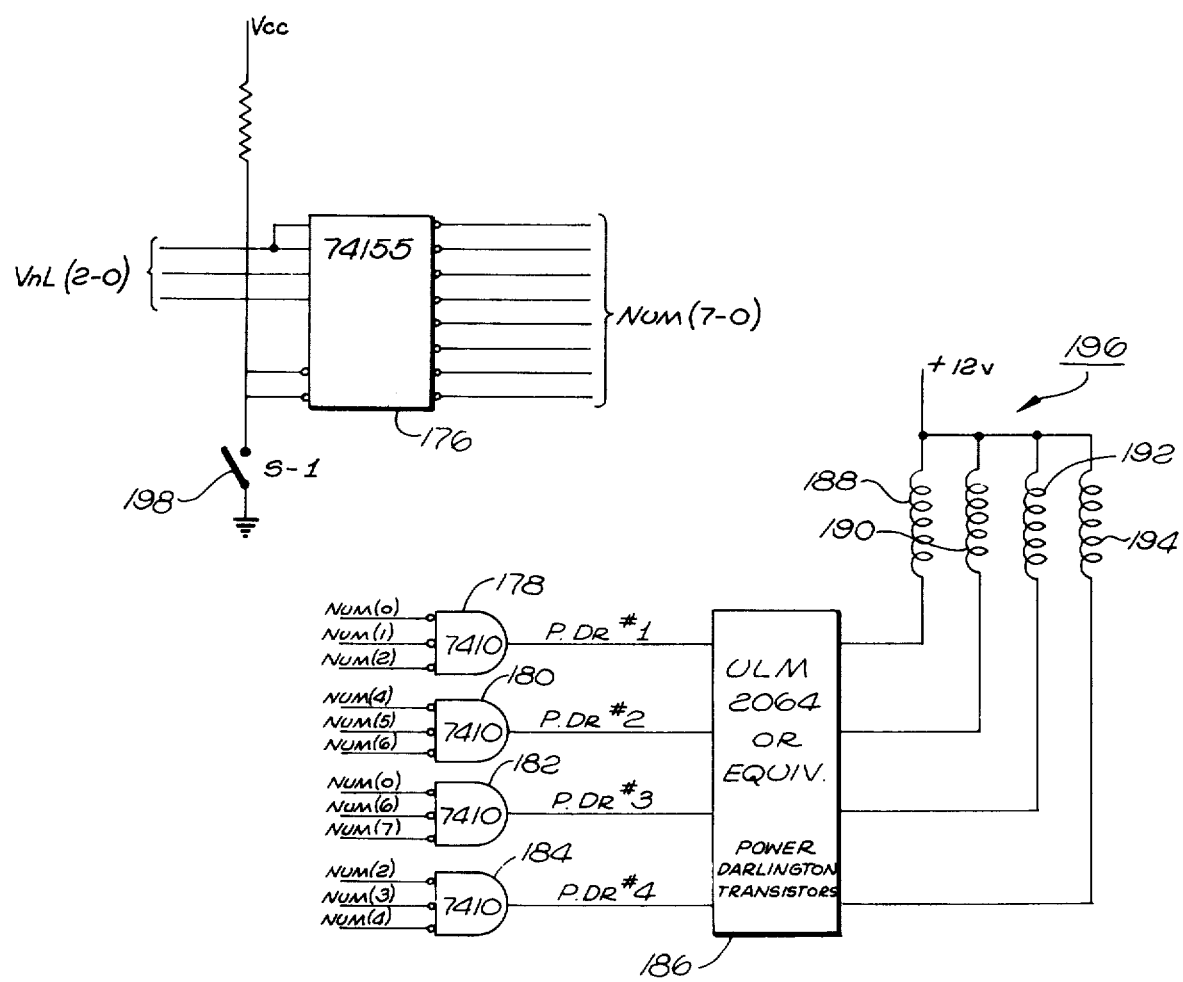
FIG. 12

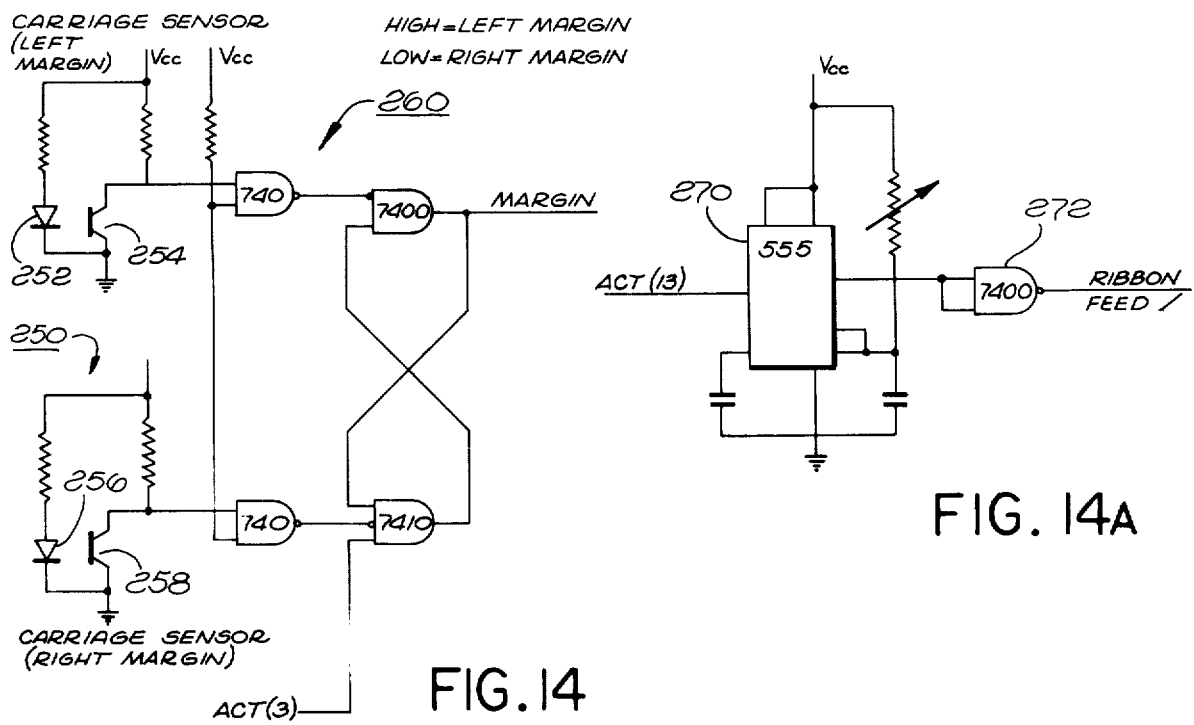
FIG. 14A
FIG. 14
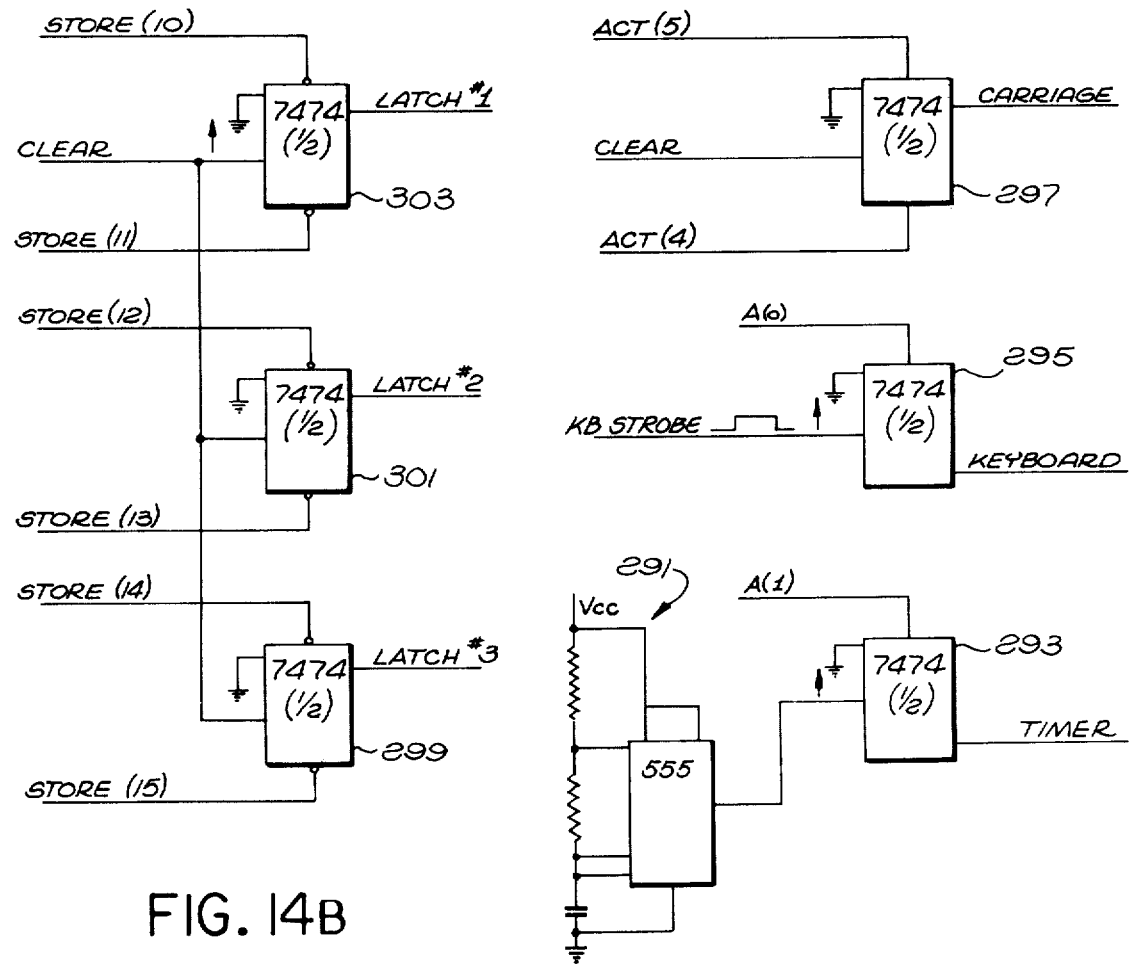
FIG. 14B

DIGITAL PRINTOUT ARRANGEMENT WITH MAGNETIC FIELD CARRIAGE DRIVE

BACKGROUND OF THE INVENTION

1. Field of the Invention

This invention relates to the printout art and more particularly to an improved high speed printout arrangement for providing a printout in predetermined characterizations in response to a known coded input signal.

2. Description of the Prior Art

Many prior art devices have heretofore been utilized to provided printouts, sometimes in alpha-numeric form, in response to a predetermined input signal comprising, for example, a serial by bit coded signal. Such structures, as well as structures for ancillary equipment therewith are illustrated in U.S. Pat. Nos.:

| | | |
|---|---|---|
| 2,802,414 | 3,174,427 | 3,519,118 |
| 2,869,455 | 3,419,887 | 3,627,096 |
| 3,708,050 | 2,997,152 | 3,405,392 |
| 3,236,351 | 3,167,166 | 2,928,338 |
| 2,851,141 | 2,829,592 | 2,818,800 |
| 3,625,142 | 3,463,884 | 3,795,298 |
| 3,703,949 | | |

However, it has been desired, in many applications to provide digital movement, rather than analog movement, of certain of the structures in such printout devices and, further, have a high printout speed.

SUMMARY OF THE INVENTION

Accordingly, it is the object of the present invention to provide an improved high speed printout arrangement.

It is another object of the present invention to provide an improved high speed printout arrangement having programmable capabilities for converting a known coded input signal into a printout in a desired corresponding characteristic form.

It is yet another object of the present invention to provide an improved high speed printout arrangement which has programmable capabilities for converting a known coded input signal into various selectable corresponding printouts.

It is yet another object of the present invention to provide an improved high speed printout arrangement in which the carriage carrying the printout head is moved digitally and has the capability of extremely rapid forward and reverse movement and may be programmed to print for the condition of carriage movement in either direction.

It is still another object of the present invention to provide an improved high speed printout arrangement in which the carriage carrying the printout head is digitally moveable at high rates of speed in both a forward and reverse direction and the platen, which moves the medium upon which the printout is obtained, is programmable to move digitally in forward and reverse directions to provide not only line spacing but any desired printout relationship between the carriage movement and the medium movement for obtaining, for example, superscripts, and subscripts without excessive time loss in unnecessary carriage or platen movement.

The above and other objects of the present invention are achieved, according to a preferred embodiment of the present invention by providing a frame upon which a carriage is mounted for reciprocating motion. The carriage carries the printout head which, in this embodiment, may comprise a dot printer of the type having a predetermined array of plurality of dot print heads. Each dot print head is selectively energizable to provide a printout impression. For example, the printout head may comprise seven dot printers arranged in a linear array substantially perpendicular to the direction of reciprocating movement of the carriage.

The carriage movement is controlled by magnetic forces interacting between a plurality of electromagnets mounted on the carriage and a plurality of spaced apart magnetic pole pieces mounted in a linear track. Thus, the carriage drive for providing the reciprocating motion of the carriage is a form that in some respects is similar to a linear induction motor. The carriage moves digitally on the track in incremental steps, the printing occurring as programmed at the end of the movement in each incremental step. By appropriate selection of the number, size and spacing of the electromagnets on the carriage with respect to the number, size and spacing of the pole pieces in the track, any desired incremental sized step may be achieved. For example, if the spacing of the pole pieces on the track may be considered to have a value of 1, proper selection of the electromagnets on the carriage can provide unitary spacing, corresponding to the spacing of the pole pieces, half spacing, ⅓ spacing, ¼ spacing, ⅕ spacing, or any other desired spacing. By selectively energizing the electromagnets on the carriage with respect to the position of the pole pieces on the track, at predetermined frequencies, digital movement of the carriage and hence, digital movement of the print head can be achieved at any desired speed within the physical limits of the mechanism.

As noted above, the printout head, which may comprise a plurality of dot printers, is mounted on the carriage and moves therewith. The individual print heads are selectively solenoid driven to provide selective operation of each individual print head, for example, at the end of each step of movement, by an appropriate print control signal. It will be appreciated that any desired array of the print heads may be utilized. In the present embodiment, the print heads are arranged such that the print wires are brought to a focus in a linear array in a vertical line. In such dot printers a predetermined number of horizontal steps of movement of the incremental carriage define one complete character and, for example, the total number of steps, from the beginning of one character to the beginning of the next character, by the print head may be selected as seven: comprising five print steps and two space steps between characters.

A platen is rotatably mounted on the frame adjacent to the path of movement of the carriage and in printout relationship to the printout head. The platen is digitally rotated in both forward and reverse directions carrying with it a medium upon which the printout is to be obtained. For example, the medium may be conventional paper, graph paper or any other desired medium.

An ink ribbon is positioned intermediate the printout head and the platen, to provide the printout impression on the medium in response to the activation of the dot printers. The ribbon is digitally controlled for appropriate digital movement as necessary. The ribbon is wound upon two spools and movement of the ribbon is controlled by a solenoid ribbon stepping actuator. In this embodiment there may be provided, on the carriage, two ribbon spools and two stepping actuators, one for controlling rotation of each of the spools.

Appropriate digital control signals for controlling the digital reciprocating movement of the carriage, digital rotation movement of the platen, digital linear movement of the ribbon and print control signals for actuation of the print head are derived from a programmable microprocessor comprising, essentially, a mini, special purpose computer incorporated as part of the printout arrangement. The computer generates the appropriate digital control signals and print signals in response to an input coded information signal and in response to certain information signals generated by the various portions of the structure, in order to provide a desired character printout in response to the particular incoming coded information signal. The computer has a memory in which one or more programs may be stored. The programs in the memory control the sequential operations of the various portions of the printout arrangement and the flow, logic and timing interactions among and between the various components to provide the desired character printout. In the preferred embodiment as described herein, the program comprises an instruction format whose length is eight binary bits. Arithmetic and logical operations, as well as movement of data among and between the components of the structure, are carried out in a four bit binary parallel mode.

The computer also has, preferably, information storage capability to provide a variation in modes of operation of the present invention. For example, appropriate programs and controls in the computer may be stored to provide the ability to print either in the conventional left to right direction of movement of the carriage or, if desired, in addition thereto, in the right to left movement of the carriage in order to minimize any lost time which might be a result of carriage return time from the right hand margin to the left hand margin. Thus, even though the speed of movement of the carriage, according to the principles of the present invention, approaches the physical limits of the moving carriage and equipment carried thereon, even greater printout speeds can be accomplished by providing the memory and storage capability in the computer for at least one line of printing so that both left to right and then right to left line printout may be achieved.

Additionally, appropriate programs may be incorporated in the computer to perform a plotting function in response to the coding in the known input signal. Because the platen digitally moves incrementally in both forward and reverse directions and the carriage digitally moves incrementally in both left and right directions, selective actuation of the appropriate dot print heads in timed sequence to the movement of the carriage and platen can provide any desired degree of complexity in plotting a two dimensional graphical representation. For example, the digital incremental step of the carriage and the platen may be on the order of 0.006 inches and, therefore, virtually complete plotting in any characteristic form desired may be obtained.

An appropriate program may be incorporated in the memory of the computer to provide special characteristics in the printout such as italics, mathematical symbols, chemical symbols, Greek letters, and the like. Since each such special character can be defined by a plurality of individual dots in a two dimensional matrix, appropriate controls to the print head during movement of the carriage and/or movement of the platen can be utilized to generate any desired output in a preprogrammed fashion in response to the known given input signal.

In providing conventional left to right printing, the carriage, by appropriate control of the electromagnets contained therein, is caused to step incrementally one position to the right. At the end of the step selected print wire solenoids are actuated causing the print ends of the print wires to move in the direction of the platen and strike the ribbon. Such movement compresses the ribbon against the printout medium to cause an impression. Therefore, for each print head actuated an individual dot is obtained. After completion of the print stroke, the print wire returns to its deactivated position. The next incremental step of the carriage moves the carriage and print head one step to the right and at the end of the step a second preselected set of the print heads is actuated to cause an impression upon the print medium as described above. This process is repeated a third, fourth and fifth time, each step resulting in the activation of predetermined print heads. Thus, in this example, each character is represented by a matrix of dots seven units high and five units wide. The spacing between the dots on the print medium may, for example, be equal to the spacing between steps of the carriage. Therefore, each character matrix is a seven by five matrix. Two additional steps are provided for intercharacter spacing.

Darlington transistors of conventional two stage type may be utilized as power amplifiers for controlling the electromagnets on the carriage to control the digital movement thereof, for controlling the print signals to the individual print wire solenoids and for controlling the digital movement of the two ribbon spool stepping solenoids. Additionally, a left and a right "end of ribbon" momentary switch and associated circuitry may also be incorporated on the carriage and be operatively connected to switch activation of the ribbon spool stepping solenoids when such "end of ribbon" condition is detected on either the right or left ribbon spool. Activation of the appropriate momentary switches when the "end of ribbon" condition is detected is utilized as a basis for a control signal to cause the alternate winding and unwinding of the ribbon from the spool.

The carriage and associated structure mounted thereon ride upon track on bearings which also serve as wheels for supporting the carriage during the reciprocating motion thereof. The carriage is constrained for movement in a horizontal plane and in a path that is parallel to the face of the platen. A multi-wire, flat cable is utilized to provide interconnection of the carriage to the other elements of the structure and the cable is terminated in the carriage at one end and is mechanically constrained to the frame at the other end thereof. Movement of the carriage causes the cable to roll or unroll in a manner similar to, for example, a track on a track vehicle such as a military tank.

The electrical connections to the cable are provided in the computer and the appropriate signals are sent from the computer through the cable to the carriage and certain other signals are sent from structure associated with the carriage back to the computer. These other signals may comprise various position indicating signals for indicating the position of the carriage, ribbon condition, activation of the print head and/or any other desired interconnection functions between the carriage and the computer. All such signals, of course, are controlled in duration and time relationship by the appropriate logic in the computer.

Rotational motion of the platen is also digital and in incremental steps and is achieved by a commercially available stepping motor coupled through an appropriate gear train to the platen shaft. Utilization of the appropriate gear ratios between the stepping motor and the platen shaft produces advancing or backing of the printout medium, which is moved by the platen, equivalent to the center-to-center separation in the vertical plane of adjacent print wires. Line advance on the printout medium is accomplished by successive incremental advances of the platen.

In another embodiment of the present invention an appropriate electronic keyboard is incorporated in the printout arrangement of the present invention. The predetermined signals generated by selective actuation of the various elements of the keyboard are coupled directly into the computer and may be utilized in the computer to provide both printout, at the point of the keyboard, as well as conversion of the keyboard signals into an appropriate output signal which may be transmitted to other printout devices or communications switching units located remote from the printout arrangement of the present invention.

As defined by the American Standard Code for information interchange, as appearing in the National Bureau of Standards Federal Information Processing Standard Publication Number 7, the coded information signal may be of the form of seven information bits and one parity bit. Such a signal is considered for utilization in describing the embodiments of the present invention herein. As such, the coded information signal received by the printout arrangement according to the present invention and, if provided, transmitted by the arrangement to remote locations, may comprise a serial by bit coded information signal. With such an incoming coded information signal, a serial by bit to parallel by character converter is incorporated to receive the incoming signal and convert same to a parallel by character signal. Similarly, in the embodiment incorporating the capability of providing an output signal for transmission to locations remote, a parallel by character to serial by bit converter is incorporated. Such input and output conversions conform to the Electronics Industries Standards Associations rs232 c for serial binary data communications in preferred embodiments of the present invention.

BRIEF DESCRIPTION OF THE DRAWINGS

The above and other embodiments of the present invention may be more fully understood from the following detailed description taken together with the accompanying drawing, wherein similar reference characters refer to similar elements throughout and in which:

FIGS. 2A, 2B, 2C and 2D are tabular presentations of various functions associated with the present invention;

FIG. 3 is a schematic diagram of portion of a computer useful in the practice of the present invention;

FIG. 3A is a tabular presentation of certain characteristics of a computer useful in the practice of the present invention;

FIG. 6B is a tabular presentation of the characteristics of a keyboard useful in the practice of the present invention;

FIGS. 11 and 12 are schematic diagrams of other portions of a platen useful in the practice of the present invention;

FIGS. 14, 14A, 14B and 15 are schematic diagrams of other aspects of the present invention.

DESCRIPTION OF THE PREFERRED EMBODIMENTS

General System Description

Figure 1:
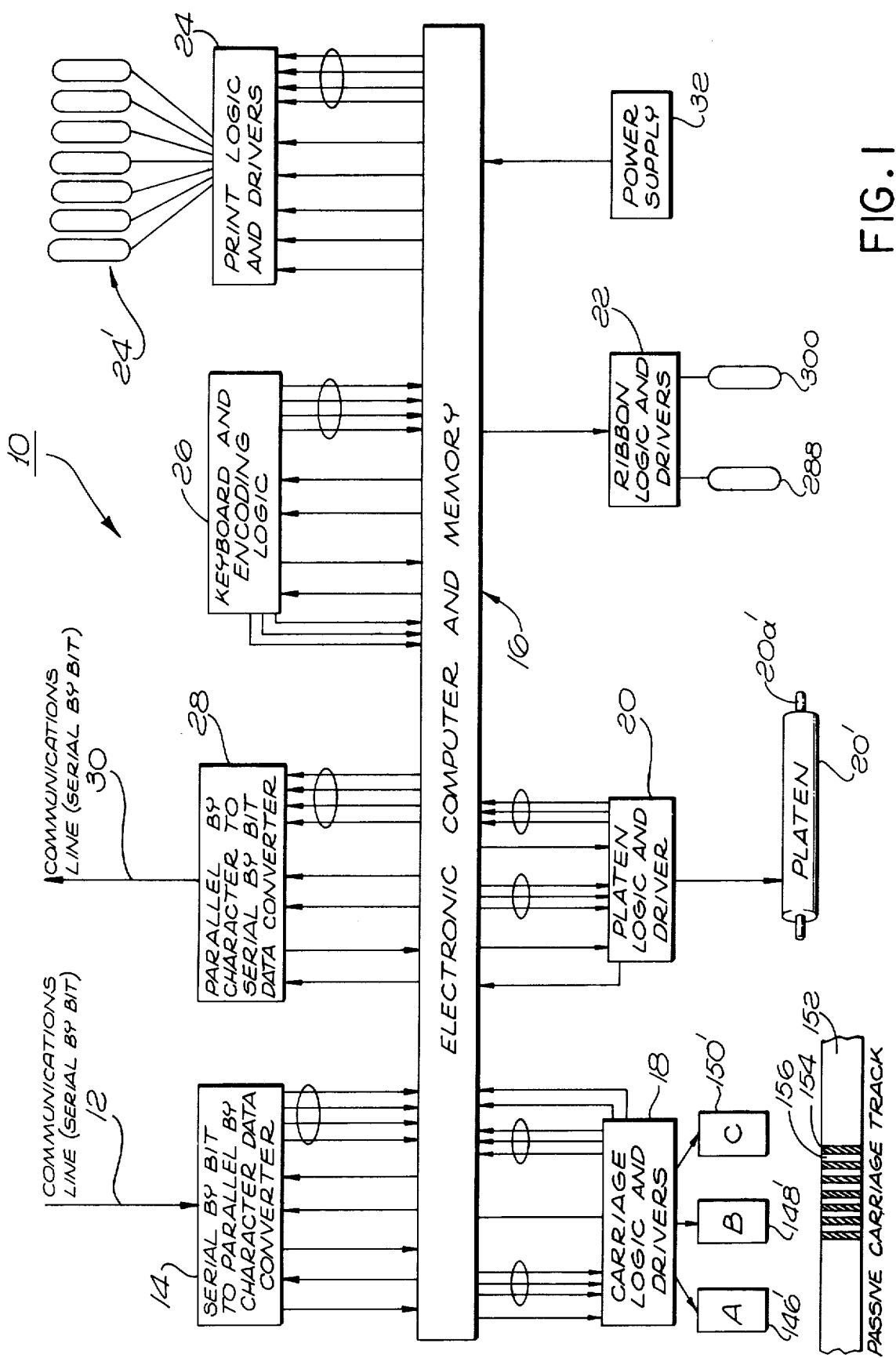
FIG. 1 is a semi-block diagram, semi-pictorial and semi-signal flow form representation of one embodiment of the present invention.

Referring now to FIG. 1, there is shown one embodiment generally designated 10 of the present invention, in semi-block diagram, semi-pictorial and semi-signal flow form.

In the embodiment 10 shown on FIG. 1, there is a communications line 12 having an input information signal comprising a first coded input information signal. The first coded information signal may, for example, be in accordance with the aforesaid standards and comprise a serial-by-bit coded information signal containing seven bits of information and one parity bit per character. The first coded input information signal is received in a serial-by-bit to parallel-by-character data converter 14. In the converter 14, the first coded input information signal is converted to a second coded information signal which, in this embodiment, may comprise a parallel-by-character signal which is comprised of the four data bits, a data ready strobe signal and a status signal. This second coded information signal is fed into the computer and memory 16. The computer and memory 16 is, essentially, a special purpose, mini computer comprising what is termed a micro processor. For convenience, it is hereinafter generally referred to as a computer.

As described below in greater detail, the computer and memory 16 is utilized to control the flow of signals between and operation of a moveable carriage 18, a moveable platen 20, a ribbon 22 and print head 24.

Additionally, if desired, a keyboard 26 may also be provided for generating keyboard signals which are similarly fed into the computer 16. When such a keyboard is incorporated, a second converter 28 comprising, for example, a parallel-by-character to serial-by-bit converter is provided to generate an output coded information signal in output line 30 for transmission to regions remote the printout arrangement 10 and the output coded information signal may, for example, be a serial-by-bit coded information signal. A power supply 32 of conventional design is utilized to provide the necessary regulated power for operation of the computer and structure associated with the printout terminal 10.

The computer and memory 16 store a list of instructions utilized for controlling the dynamics of the system interaction between the various components of the system shown on FIG. 1. It will be appreciated that, by modifying or changing the instructional format of the program stored in the computer and memory 16 various alternative embodiments of the present invention can be imparted without physical modification to the system. Therefore, in the following description, one of many possible sets of instructions is described. The particular instructional format described herein generally comprises the corresponding types of instructions found in present printout arrangements. That is, upon receipt of a known input coded information signal of the type and characteristics described above, the printout is obtained in alpha-numeric characters. However, utilization of such an instructional format is not limiting to the present invention and, it will be appreciated, any desired correspondence of printout character for a given character represented by a particular code set in the input signal may be achieved.

Computer and Memory 16

Referring now to FIGS. 2A, 2B, 2C, 2D, 3, 3A, 4 and 5, there is illustrated therein, a schematic diagram form, and is represented by various tabular presentations, one embodiment of a computer and memory 16 useful in the practice of the present invention. For the computer and memory 16, operation thereof is controlled and/or directed by a set of instructions stored in the memory portion thereof. In the embodiment 10 of FIG. 1, the instructional format is composed of eight binary bits of information. For the particular components illustrated in the drawing, up to 256 of these instructions may be stored in the memory portion. However, it will be appreciated, a greater or lesser amount of such storage capability in the memory section of the computer and memory 16, may be utilized in accordance with the principles of the present invention.

The individual bits of a typical instruction may be assigned a position number as shown in FIG. 2. Bit seven is designated as the "Y" bit, bits 6, 5, and 4, as the "X" field bits, and bits 3, 2, 1 and 0 as the "A" field bits. Connectively, the Y and X fields are an operation code or designation and the A field is an address or data designator.

The electronics associated with the computer and memory 16 consists of various integrated circuit (IC) components commercially available from multiple sources. For illustrative purposes, illustrative IC components are designated by their Texas Instrument, Inc., part number. Detailed description of the characteristics and other information on such IC components may be found in the publication, "TTL Data Handbook, Texas Instruments, Inc. (CC-441-71241-23-CHI), Copyright 1973."

Figure 4:
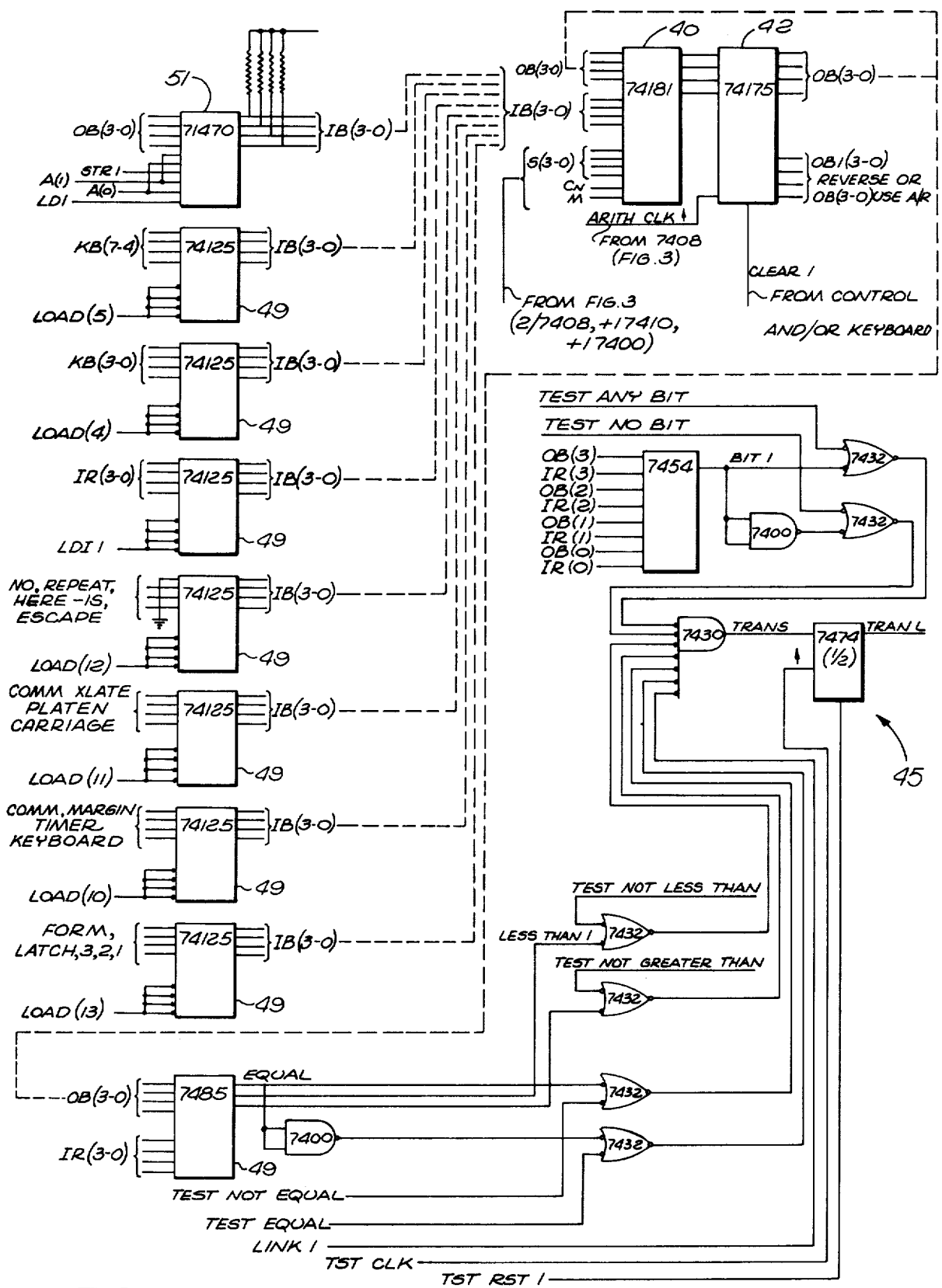
FIGS. 4 and 5 are schematic diagrams of other portions of a computer useful in the practice of the present invention.

The heart of the computer and memory 16 consists of the SN 74181 IC component, which is an arithmetical logic unit/function generator 40, shown in FIG. 4. As used herein, this IC component 40 will perform the arithmetic logical or data movement function in accordance with the instruction code characteristic set forth in FIGS. 2A, 2B, 2C and 2D. The individual function performed is selected by six control signals directed at the component 40, which control signals are designated at $C_n$, M, $S_3$, $S_2$, $S_1$, and $S_0$. Logical values for these control signals for the arthmetic logical or data movement function to be performed are shown in FIG. 3A. The resultant binary data from these operations consisting of four bits of information are captured and stored in a quad latch 42, shown on FIG. 4, which comprises an SN 74175 IC component.

As shown in FIG. 4, two sets of four data bits are provided as inputs to IC 40. The first set, designated IB(3-0), which is an abbreviation for Input Buss bits 3, 2, 1, and 0, is derived from a multiplicity of sources, as discussed below in greater detail. The second set of four data bits, designated OB(3-0), an abbreviation for Output Buss bits 3, 2, 1 and 0, is the output of the IC 42 quad latch and, as such, is the result of a previous instruction.

In order to understand the operation of this portion of the computer and memory 16, a particular instruction is traced through the logical sequences of the circuitry of the computer and memory 16. Since the total logical process in the computer and memory 16 is circular in nature, tracing of the instruction through the circuitry may begin at any arbitrary point. For illustrative purposes, the instruction "LOAD IMMEDIATELY" is selected. As shown in FIGS. 2A, 2B, and 2D for the instruction LOAD IMMEDIATELY, Y=0, X=1, and A may have any allowed value between 0 and 17 (base 8).

As shown in FIG. 3, the instruction, designated IB(7-0) an abbreviation for Instruction Buss bits 7, 6, 5, 4, 3, 2, 1, and 0, is captured and held in the instruction register 44 comprised of two IC 74175 components. Such captured retention of the IC 7-0 instruction is achieved by a positive transition of the instruction clock signal (INSTCLK). The output of the instruction register, consisting of the Y bit (Y=0) and the Y bit negated (Y=1), the X bit (X=1) and the A bits (A=any value) apply to the instruction decode circuitry 46 comprised of two SN 74155 IC components 48 and 50, and three SB 74154 IC components 52, 54 and 56, together with the associated gates 58, 60, 62, 64, 66, 68, 70, 72, and 74. Since, for the present example, the Y=0 signal alone is active, such signal decodes the X bits into one of eight possible values: 7 through 0. As noted above, for the particular example selected, X=1 and the line designated "LDI", an abbreviation for Load Immediate, shown on the output of IC 46, becomes active. Additionally, the other output lines of IC 46 designated, ADD, SUB, AND, OR, XOR are not active. As shown in FIG. 3, the ADD, SUB, AND, OR, XOR lines are applied to the operation code generation circuit 84 comprised of the gates 76, 78, 80 and 82 and generates the C, M, S3, S3, S1 and S0 signals, which are applied to IC 40 (FIG. 4) to condition the IC 40 to load. In order to load, the IC 40 passes the data on the IB(3-0) without modification and ignores any data on the OB(3-0).

As the LDI line of IC 48 is active, it causes the A bits of the instruction register 44 to appear on IB(3-0) through IC 100 (FIG. 4) which is a SN 74125 IC component and, further, to appear as an input to the SN 74175 IC quad latch 42. An arithmetic clock (ARITHCLK) positive transition is generated for every instruction by IC 58, an SN 7408 IC component, and associated gate (not shown) (as illustrated on FIG. 3) for which Y=0 is also applied to IC 42 quad latch, resulting in a capture and holding of the data and completes the functional elements of the instruction.

Figure 5:
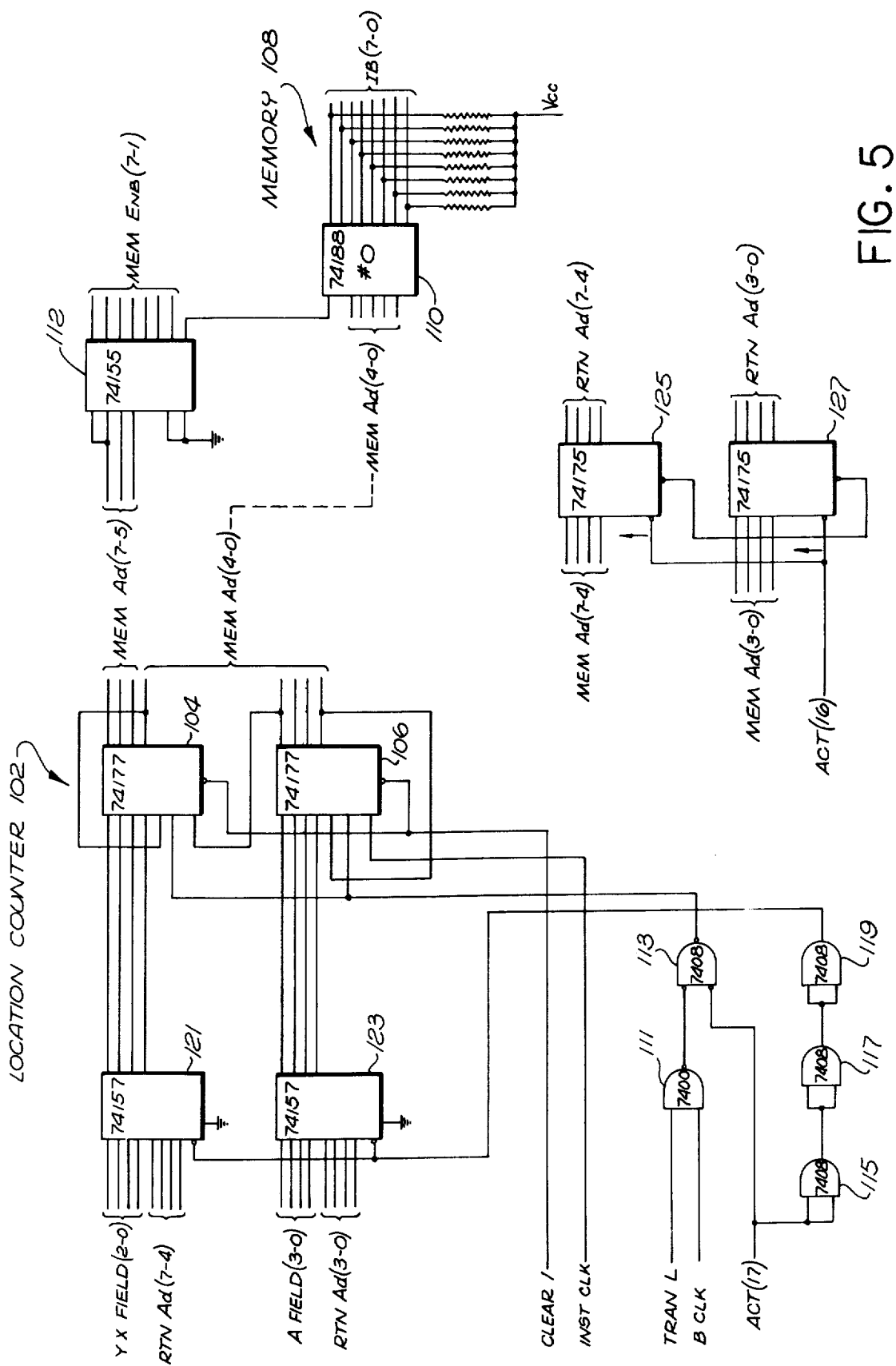

At the beginning of the instruction cycle, the INSTCLK signal (negative transition) is used to step the location counter 102 (FIG. 5), which comprises two SN 74177 IC components 104 and 106. The output of the location counter 102 is designated MEMAD (7-0), an abbreviation for memory address bit 7,6,5,4,3,2,1 and 0. The MEMAD signal is applied to the memory 108 comprised of up to eight SN 74188 IC components which are read only memory IC components. FIG. 5 shows only one such read only memory component designated 110 and comprising number 0 of up to 0, 1, 2, 3, 4, 5, 6, or 7 such elements. The remaining seven, if utilized, are connected in a manner similar to element 110 shown on FIG. 5. The memory 108 contains 32 instructions. (Seven more elements 110 provide the desired 256 bit memory storage) MEMAD (4-0) is applied to each of the eight SN 74188 IC components such as component 110 of the memory 108 and selects one of the possible 32 instructions to appear as the output of the memory 108. MEMAD (7-5), from 104, is applied to IC 112 comprising an SN 74155 IC component which decodes the input into one of eight mutually exclusive outputs. One each of these outputs is applied to the eight SN 74188 IC components in the memory 108 and the active lead causes the associated SN 74188 IC component in the memory 108 to present the selective instruction at its output. Output of the SN 74188 IC components constitutes the Instruction Buss IB(7-0). Thus, there has now been provided a unique signal corresponding to the LOAD IMMEDIATELY instruction to appear on the instruction buss IB(7-0).

The instruction execution has come full circle and the circuitry is conditioned to proceed with the next instruction. The various clock signals which control the individual steps within the cycle are sequenced by the clock generation circuit 116 (FIG. 3) comprised of the SN 74123 IC component, 118, and the associated capacitors and resistors, to provide the signals as illustrated at 122 of FIG. 3.

For convenience, the following is a brief description of each of the instructions executed by the computer and memory 16. FUNCTION:LOAD — Y=0, X=0, A=0-15.

The data from the source designated by the A field bits, as set forth in FIG. 2A is transferred to the quad latch 42.

FUNCTION:LOAD IMMEDIATE — Y=0, X=1, A=0-15.

The value of the A field is transferred to the quad latch 42 of FIG. 4.

FUNCTION:ADD IMMEDIATE — Y=0, X=2, A=0-15.

The value of the A field is arithmetically added to the prior value of quad latch 42 and the result is left in the quad latch 42.

FUNCTION:SUB IMMEDIATE — Y=0, X=3, A=0-15.

The value of the A field is arithmetically subtracted from the prior values of quad latch 42 and the result is left in the quad latch 42.

FUNCTION:AND IMMEDIATE — Y=0, X=4, A=0-15.

The value of the A field is logically ANDed with the prior value of the quad latch 42 and the result is left in the quad latch 42.

FUNCTION:OR IMMEDIATE — Y=0, X=5, A=0-15.

The value of the A field is logically ORed with the prior value of quad latch 42 and the result is left in quad latch 42.

FUNCTION:XOR IMMEDIATE — Y=0, X=6, A=0-15.

The value of the A field is logically exclusive ORed with the prior values of quad latch 42 and the result is left in the quad latch 42.

FUNCTION:(NOT USED) — Y=0, X=7, A=λ 0-15.

FUNCTION:TRANSFER ANY BIT — Y=1, X=0, A=0-15.

The current value of quad latch 42 is compared with the value of the A field. If a match is found in any bit position, the next instruction consisting of eight bits becomes the new value of the location counter 102. If not, the next instruction is skipped.

FUNCTION:TRANSFER NO BIT — Y=1, X=1, A=0-15.

The current value of quad latch 42 is compared with the value of the A field. If a match is not found in any bit position, the next instruction consisting of eight bits becomes the new value of the location counter 102. If a match is found, the next instruction is skipped.

FUNCTION:TRANSFER NOT LESS THAN — Y=1, X=2, A=0-15.

The current value of quad latch 42 is compared with the value of the A field. If the latter is not less than the former, the next instruction consisting of eight bits becomes the new value of the location counter 102. If the latter is equal to or greater to the former, the next instruction is skipped.

FUNCTION:TRANSFER NOT GREATER THAN — Y=1, X=3, A=0-15.

The current value of quad latch 42 is compared with the value of the A-field. If the latter is not greater than the former, the next instruction consisting of eight bits becomes the new value of the location counter 102. If the latter is equal to or less than the former, the next instruction is skipped.

FUNCTION:TRANSFER EQUAL — Y=1, X=4, A=0-15.

The current value of quad latch 42 is compared with the value of the A-field. If the latter is equal to the former, the next instruction consisting of eight bits becomes the new value of the location counter 102. If the latter is not equal to the former, the next instruction is skipped.

FUNCTION:TRANSFER NOT EQUAL — Y=1, X=5, A=0-15.

The current value of quad latch 42 is compared with the value of the A-field. If the latter is not equal to the former, the next instruction consisting of eight bits becomes the new value of the location counter 102. If the latter is equal to the former, then the next instruction is skipped.

FUNCTION:STORE — Y=1, X=6, A=0-15.

The current value of quad latch 42 is transferred to the destination as designated by the A field bits. As set forth in FIG. 2C when a destination is not a storage register, a signal pulse is transmitted to the specified destination.

FUNCTION:ACT — Y=1, X=7, A=0-15.

A signal pulse is transmitted to the destination designated by the A field bits as defined in FIG. 2D. The purpose of the individual instructions are to control various components of the printout arrangement 10.

Each of the components is discussed below in greater detail.

The logic circuitry 75 is provided for implementation of the conditional and unconditional transfer instructions such as, for example, (Y=1) (X=0) TRANSFER ANY BIT, or others as shown on FIG. 2B.

The logic circuitry 45 is provided for implementation of the conditional test and transfer instruction, such as TRANSFER NOT EQUAL (Y=1) (X=5), or others, as shown on FIG. 2B.

The plurality of gates 49 (SN 74125IC) control selection of the source of input data allowed to be transferred into IC 40. IC 51, consisting of four 4-bit general purpose storage latches, may be an SN 74170 IC, and it utilized for temporary storage and retention of certain signal values associated with certain computer and memory 16 functions.

The gates 111, 113, 115, 117 and 119 together with the four two to one selectors 121, 123, 125, and 127 (SN 74157 IC component) are utilized to reset the location counter in accordance with specific signals such as return address (from IC 125 and 127) or transfer address generated by a transfer instruction, shown in FIG. 4 as Y, X field (2-0), A field (3-0).

Keyboard 26

As noted above, the keyboard 26 may be incorporated in the certain embodiments of the present invention wherein it is desired to provide a manually operated control for originating an output signal which may be transmitted to regions remote from the printout arrangement 10. However, it will be appreciated, that in those embodiments of the present invention wherein it is not desired to incorporate a structure for providing encoding of information for such transmission to remote locations, the keyboard 26 may be omitted.

Figure 6A:
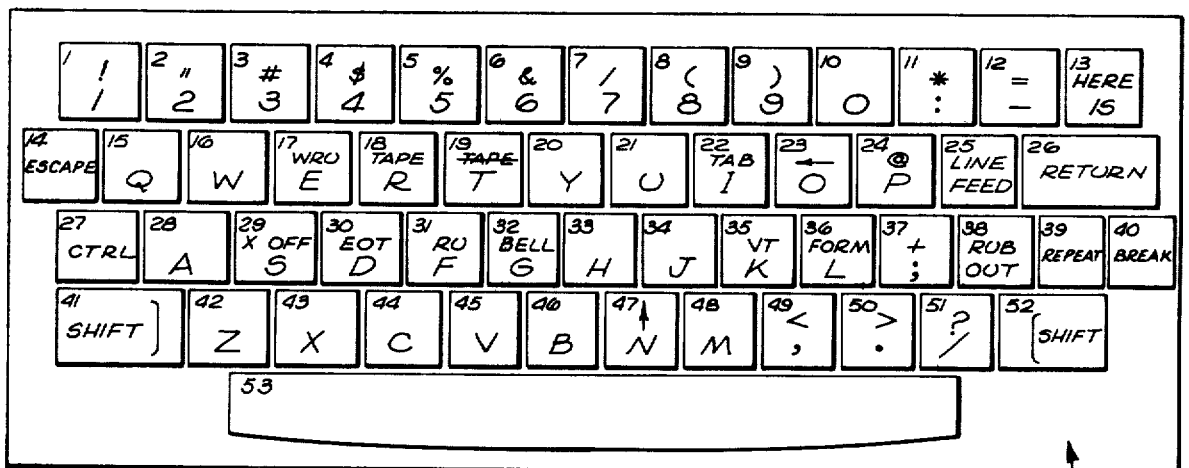
FIG. 6A illustrates a keyboard useful in the practice of certain embodiments of the present invention.
Figure 6B:
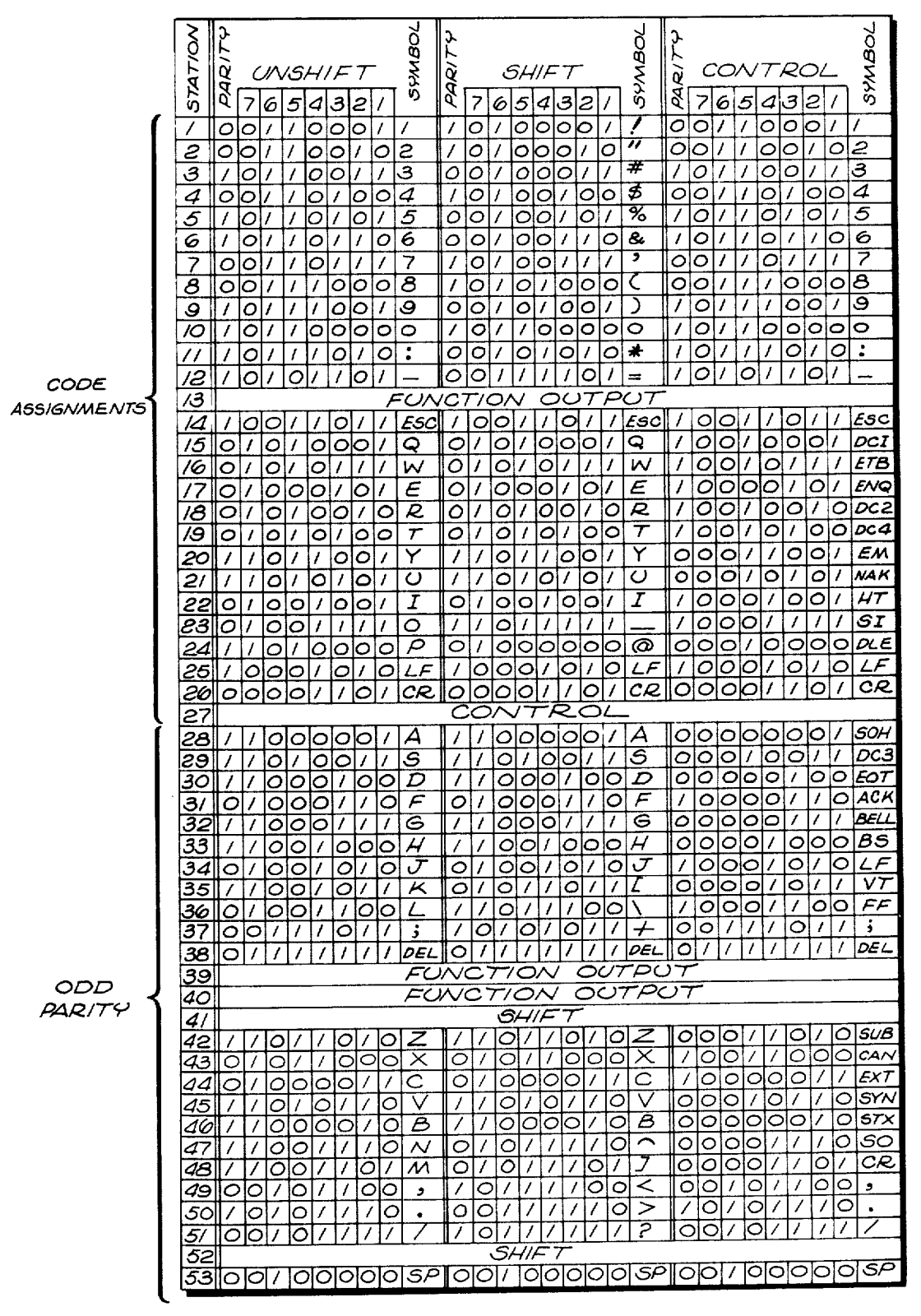

If the keyboard 26 is incorporated, the keyboard 26 and its associated electronics may be a standard commercially available design such as that illustrated in FIG. 6A and which may comprise a Clare pendar, Post Falls, Idaho, teletypewriter keyboard such as the 53-key Model K353 as illustrated in FIG. 6A. When one of the keys of the keyboard 16 is depressed, the electrical output of the keyboard 16 is a "strobe" signal and an eight bit character (seven data bits and parity bit) generated as shown in the tabular presentaton of FIG. 6B. The tabular demonstration of FIG. 6B specifies the particular bit code for each key identified in FIG. 6A on the keyboard 26.

Figure 7:
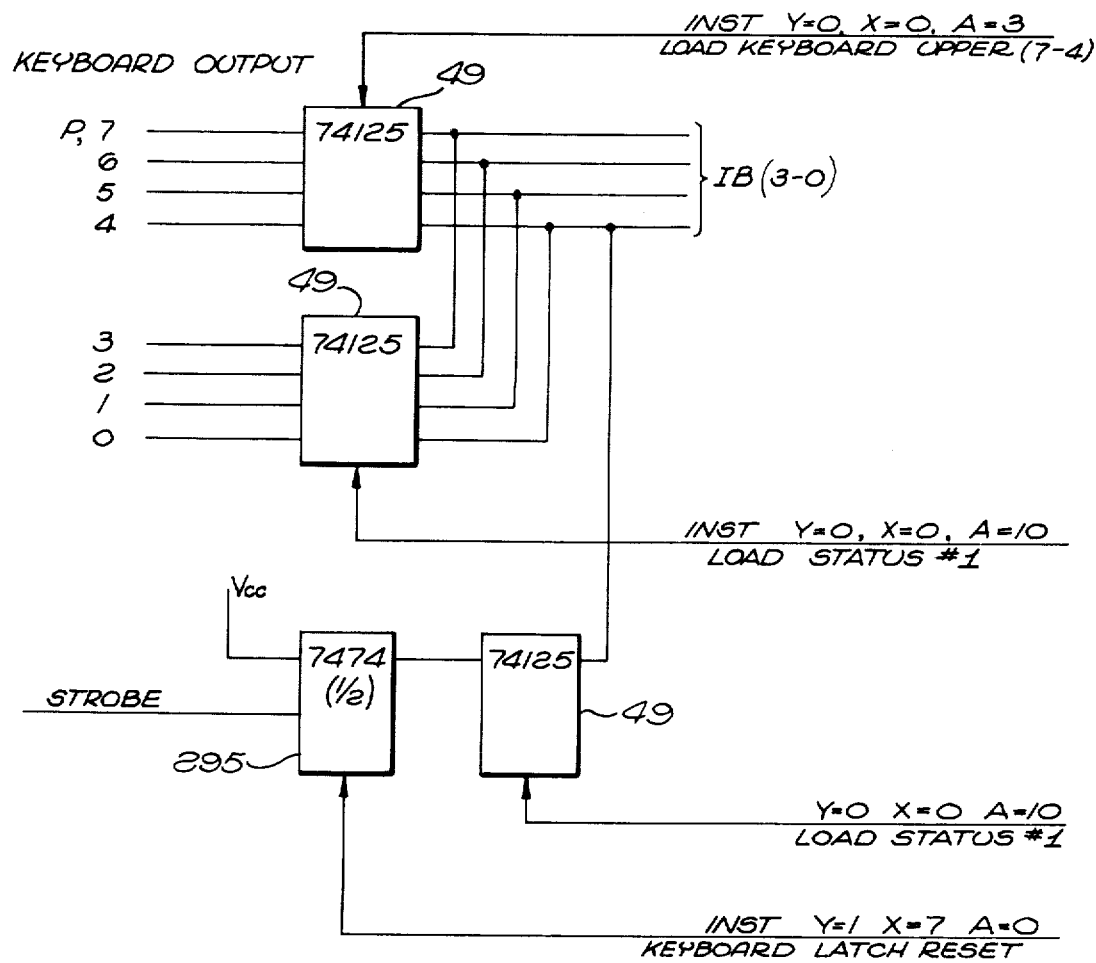
FIG. 7 is a schematic diagram of the interface between a keyboard and the computer useful in the practice of the present invention.

The keyboard 26 electronics is mated to the computer and memory 16 by the circuitry shown in FIG. 7. Upon a positive transition of the keyboard strobe, a signal is sent to latch 295 which may comprise one half of an SN 7474 IC component. By execution of the instruction LOAD STATUS #1 (Y=0, X=0 and A=10) by the computer and memory 16, the status of the strobe latch 295 may be obtained and subsequently determined. The strobe latch 295 is reset by execution of the instruction KEYBOARD LATCH RESET, (Y=1, X=7, A=0). The binary bits making up a character are transferred to the computer and memory 16 execution of the instruction LOAD KEYBOARD LOWER (3-0), (Y=0, X=0, A=4) and LOAD KEYBOARD UPPER (7-4), (Y=0, X=0, A=5). Therefore, the character bit generated by the option of operation of the keyboard 26 is transferred into the computer and memory 16 where it is further processed for a transmission to remote locations, as described in greater detail below. FIG. 7 also illustrates a more detailed interconnection of the latches 49 as discussed in connection with FIG. 4.

Incremental Carriage 18

Figure 8:
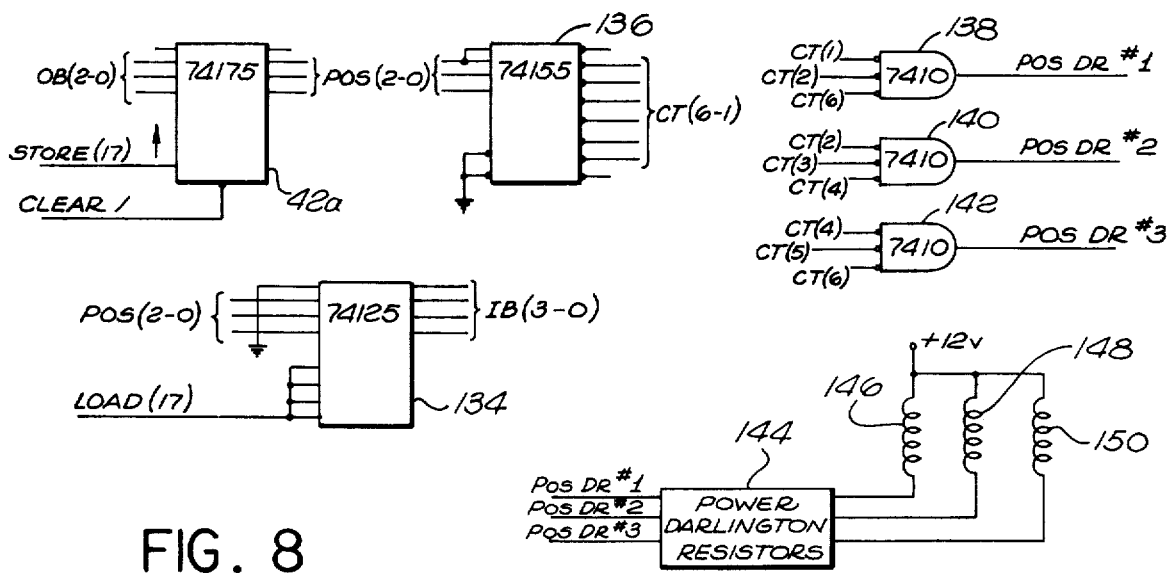
FIG. 8 is a schematic diagram of the control circuitry for a carriage useful in the practice of the present invention.

The incremental carriage 18 is propelled magnetically across the face of the platen 20. FIG. 8 illustrates the circuitry for activating the electromagnets utilized to provide the digital movement of the incremental carriage 18. Quad latch 42 receives and holds the output of the computer and memory 16 upon receipt of the instruction STORE CARRIAGE REGISTER, (Y=1, X=6, A=17). The output is a signal having a binary number of value 0 to 7. The output of quad latch 42 is transferred back to the computer and memory 16 by gate 134 comprising an SN 74125 IC component upon execution of the instruction LOAD CARRIAGE REGISTER, (Y=0, X=0, A=17).

The output of quad latch 42 is also applied to decoder 136 comprising an SN 74155 IC component which has 8 mutually exclusive outputs - CT (7 - 0), only one of which is active depending upon the value (7 - 0) of the input. Outputs (6,1,2), (2,3,4) and (4,5,6) are ORed together by the three gates 183, 140 and 142, each comprising an SN 7410 IC component. The three gates 138, 140, and 142 form, respectively, the signals POSITION DRIVE 1, POSITION DRIVE 2, and POSITION DRIVE 3. These signals are power amplified by power Darlington transistors 144 which are physically mounted on the incremental carriage and the output current is applied to the positioning electromagnetic coils 146, 148, and 150. The Darlington transistors control the flow of electric current to the coils 146, 148, and 150 selectively depending upon the particular input signals received from the gates 138, 140, and 142. Thus, power supply to coil 146 for the condition of quad latch 42 holding the binary value (6, 1, or 2). Coil 148 has power applied to it if the quad latch 42 holds a binary value of (2, 3, or 4). Coil 150 is supplied with power if the quad latch 42 holds a binary value (4, 5, or 6). Therefore, the coils 146, 148, and 150 are activated according to the following tabulation:

| Value of Binary Signal in Quad Latch 42 | Coil or Coils Energized |
| --- | --- |
| 0 | None |
| 1 | 1 |
| 2 | 1 and 2 |
| 3 | 2 |
| 4 | 2 and 3 |
| 5 | 3 |
| 6 | 3 and 1 |
| 7 | None |

Thus, a maximum of only two of the coils 146, 148, and 150 may be activated at any one time, but never all three.

Figure 9:
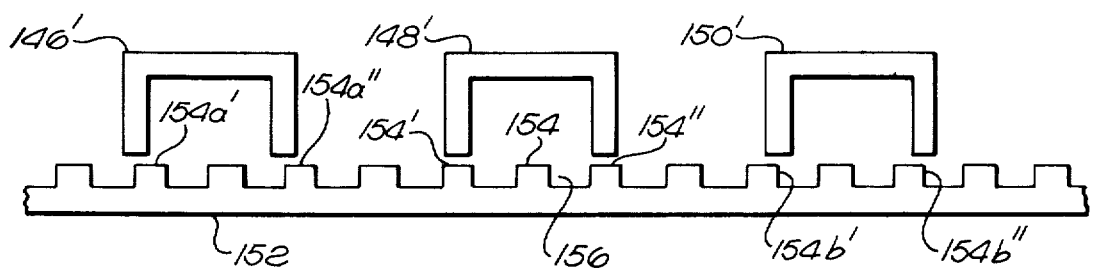
FIG. 9 is a sectional representation of a portion of the carriage useful in the practice of the present invention.

FIG. 9 illustrates the three electromagnets of the incremental carriage 26 in relation to the passive track 152 upon which the carriage rides. The electromagnet 146' is activated by energy flowing in coil 146, electromagnet 148' is activated by energy flowing in coil 148, and electromagnet 150' is activated by energy flowing in coil 150. The passive track 152 consists of a series of ridges and valleys comprising a series of equally spaced apart teeth 154 and spaces therebetween 156. For the embodiment 10 described herein, the spacing of the pole 146' 148' and 150' are such that pole piece 148' is aligned evenly with the teeth 154 of the passive track 152. The pole piece 146' is offset to the left for alignment with the teeth 154 by a spacing equal to two thirds of the space 156 between the teeth 154. Similarly, the pole piece 150' is offset to the right by a spacing of two thirds of the space 156 between the teeth 154.

Operation of the incremental carriage 18 is achieved by a digital control signal applied thereto generated in the computer and memory 16. Therefore, the incremental carriage 18 moves digitally. For example, for the condition shown in FIG. 9, if coil 148 is activated, pole piece 148' becomes magnetized. This corresponds to a binary signal value in the latch 42 of three. Magnetic forces are generated which tends to move the incremental carriage such that the pole piece 148' will be aligned with the teeth 154' and 154". As noted above, the space in between the pole pieces 146', 148' and 150' is such that for the condition of pole pieces 148' aligned with the teeth 154', 154" of track 152, the pole pieces 146' are displaced to the left of alignment with the teeth 154a' and 154a" so that two thirds of the pole pieces 146' are over the spaces and only one third are over the teeth 154a, and 154a". Similarly, the pole pieces 150' are displaced to the right of teeth 154b' and 154b" by a distance equal to two thirds of the space 156. The width of the space 156 is the same as the teeth 154. Thus, the pole piece 156 has only one third alignment with the teeth 154b' and 154b". For the condition shown in FIG. 9, if the value of the binary signal and the quad latch 42 is one, then energy to the coil 148 is terminated and coil 146 is energized thereby energizing pole piece 146'. The magnetic forces generated by the activated pole pieces 146' tend to line pole pieces 146' with the teeth 154a' and 154a", thereby moving the incremental carriage, which is attached to the pole pieces 146', 148' and 150', two thirds of a tooth width to the right to achieve the above described alignment between the teeth 154 and the pole pieces.

Similarly, if coil 150 had been energized when the energy to coil 148 was terminated, the interaction between pole pieces 150' and the passive track 152 would tend to move the incremental carriage 18 two thirds of a space to the left. This would correspond to a binary value in quad latch 42 of five.

Once the motion, either to the left or right as above described has taken place, it may be sequentially repeated since for the condition of the pole pieces of any electromagnet directly over the tooth of the passive track 152, the pole pieces of the other two electromagnets are always aligned one third left and one third right of proper alignment with the teeth 154 of the track 152. For the structure illustrated in FIG. 9, by sequentially energizing coils 146, 150, and 148, in that order, the incremental carriage will move from left to right. By changing the order of successive repetition the energizing of the electromagnets to a sequence of energizing coil 150, 146, 148, sequentially, the incremental carriage 18 will be moved from right to left.

Since physical motion of the incremental carriage 18 does not occur instantaneously, the time that an individual coil is energized is selected to be roughly equal to the time it takes the carriage to move an incremental distance. This time period is different depending upon the actual existing speed obtained by the carriage. For the condition of starting from REST, the time period is at a maximum.

It is one of the functions of the computer and memory 16 and its stored computer program to generate pulses of energy for energizing the coils 146, 148, and 150 of varied time periods: long time periods when the carriage 18 is starting from REST and during slow motion, and shorter time periods as the speed increases. The time for which an individual coil 146, 148, or 150 is energized depends upon the time for which an individual binary value is present in the quad latch 42A.

For the condition where two of the coils 146, 148, and 150 are simultaneously energized, the incremental carriage 18 will be positioned approximately half way between the position it would occupy if each one of the coils were energized exclusively. This middle position is called a half step position and, for the embodiment described herein, permits the incremental carriage 18 to be positioned approximately in increments of, for example, 0.006 inch.

The sequence of values of the binary signal in quad latch 42a for moving the incremental carriage 18 from left to right are: 654321654321, etc. For moving the carriage from right to left, the values of the binary signal sequentially present in the quad latch 42a are: 123456123456, etc. Such sequencing moves the carriage 18 in increments. Thus, the carriage 18 is incrementally or digitally moved in response to the generation of the digital control signals.

It will be appreciated, of course, that 4, 5, or more electromagnets may be employed. Obviously, different sequences of energizing the coils can also be employed for any particular desired movement. However, all such sequencing variations are merely adaptations of the basic invention described herein.

Platen

In accordance with the principles of the present invention, the platen 20 is controlled by two separate mechanizations. The platen structure 20' is controlled for digital movement for advance only one line at a time and for digital movement of an advance/backup in incremental steps. As shown on FIGS. 10, 11, and 12, the line advance only unit utilizes a commercially available AC solenoid for rotating the platen shaft through one line advance position. The solenoid is connected to the platen 20' by conventional ratchet mechanical coupling.

The incremental advance/backup control utilizes a commercially available stepping motor to rotate the platen shaft in both an advance or backup direction one incremental step at a time utilizing an anti-backlash direct mechanical gearing coupling.

Figure 10:
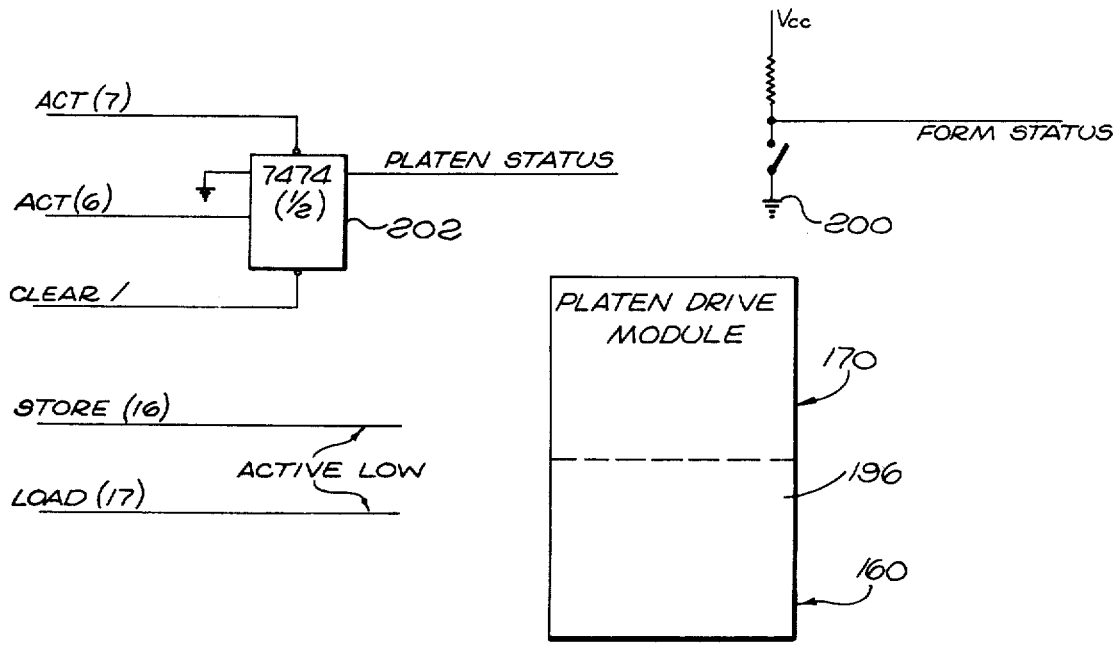
FIG. 10 is a schematic diagram of the platen control useful in the practice of the present invention.

The electronic-mechanical interface between the electronic control circuitry such as contained in the computer and memory 16 and the platen drive module 160 is shown on FIG. 10. The platen drive module 160 is comprised of the structure and circuitry for achieving both the advance/backup in incremental steps and the line-by-line movements of the platen 20'.

For the line-by-line movements shown on FIG. 11 a negative pulse, which may be generated by the execution of instruction STORE PLATEN REGISTER (Y=1, X=6, A=16) by the computer and memory 16 causes ONE SHOT component 162, which, for example, may be a SIGNETICS NE555 or equivalent, to generate a positive output pulse of approximately 60 to 70 milliseconds duration. The duration of the positive output pulse is determined by external timing components of a conventional nature which are not shown on FIG. 11. IC 164 inverts the output pulse and applies the inverted output pulse to the solid state relay 166, which, for example, may be a TELEDYNE model number 641-1. The solid state relay 166 allows the flow of the 117V, 60 cycle signal through the coil 168 of the advance only one line solenoid 170. The mechanical movement of the solenoid 170 rotates the platen shaft 20a' through, as noted above, a conventional ratchet mechanical coupling. The output pulse of the ONE SHOT circuit 162 causes the ratchet gearing between the solenoid 170 and the platen shaft 20a' to provide a rotation of the platen shaft 20a' and, of course, the platen 20' a single line to advance the medium (not shown) upon which the printout is obtained with the platen the equivalent of one line spacing.

For the incremental movement shown on FIG. 12, the execution of instruction STORE PLATEN REGISTER (Y=1, X=6, A=16) by the computer and memory 16 causes quad latch 169 to capture and retain the output of the computer and memory 16. This output is a binary number having a value between 0 and 7.

The output of quad latch 169 is transferred back to the computer and memory 16 by gate 171 (FIG. 12), which may be an SN 74125 IC component, and execution of instruction LOAD PLATEN REGISTER (Y=0, X=0, A=16).

The output of quad latch 169 is also applied to IC 176 which may be an SN 74155 IC component, and which has eight mutually exclusive outputs (NUM(7-0)), only one of which is active depending upon the value (7-0) at the input. Outputs (0,1,2), (2,3,4), (4,5,6), and (6,7,0) are ORed together by the four gates 178, 180, 182, and 184, each of which may be an IC 7410, to form the signal denominated PLATEN DRIVE 1, PLATEN DRIVE 2, PLATEN DRIVE 3, and PLATEN DRIVE 4, respectively. These platen drive signals are applied to a power Darlington transistor 186 for amplification and the output of the power Darlington transistor 186 is applied to the four motor windings 188, 190, 192, and 194 of the stepping motor 196. For the condition the power applied to the stepping motor 196 for any value retained by quad latch 42, the motor shaft (now shown) will stop and hold its existing rotational position. For example, if the value held by quad latch 42 is "0" and then, by action of the computer and memory 16, the value retained by quad latch 42 is successively changed to 1, 2, 3, 4, 5, 6, 7, 0, 1, 2, etc. in a repetitive pattern, the shaft of the motor 196 rotates 0.9° for each successive change in value of the signal held by the quad latch 42. This rotates the platen in increments to cause movement of the print medium of approximately 0.006 inch which corresponds to rotation of the motor shaft of motor 196 of 0.9°. For the condition of the successive values retained by quad latch 42 in the reverse order, that is, 7, 6, 5, 4, 3, 2, 1, 0, 7, 6, 5, etc. in a repetitive fashion, the motor shaft of motor 196 is also rotated 0.9° for each successive change in value but in the opposite direction. Thus, it is apparent that depending upon the relative value of successive signals retained by quad latch 42, the motor 196 will rotate in incremental steps of 0.9° either in a forward or reverse direction.

As noted above, the motor shaft of motor 196 is connected to the platen shaft 20A' by a conventional anti-backlash mechanical gear train. The gear train is selected so that for rotation of two successive incremental rotational movements in the forward or reverse direction of the platen 20A' by the motor 196, there is provided a paper advance or backup of a distance equal in length to the spacing between successive vertical strokes of the print head 24 as described above. (The operation of the print head is discussed below in greater detail.)

A platen release switch 198 is also provided in the circuitry shown on FIG. 12 to interrupt the application of all power to the stepping motor 196. Opening switch 198 completely de-energizes the motor 196 and the platen 20' may be freely turned manually in either direction.

A form switch 200, FIG. 10, is provided. The form switch 200 closes automatically sequentially whenever one of its contacts is grounded to the platen shaft 20A. Sequential grounding occurs when the contact is positioned with respect to the printout medium in a predetermined orientation. In general, the printout medium comprises a paper roll having a plurality of apertures therethrough. Consequently, the form switch 200 is so positioned that one of the contacts is aligned with the array of apertures in the print medium and rise against the print medium in such an alignment. Consequently, as the platen 20' rotates, and the medium rotates therewith, the contact of the form switch 200 sequentially is aligned with the aperture and thus contacts the platen shaft 20A'. The condition of the switch 200, that is, open or closed, is available to the computer 16 by execution of instruction LOAD STATUS 4 (Y=0, X=0, A=13). When the above mentioned alignment of the precut holes in the printout medium and the contact of the switch 200 occurs, the switch closes and enables the computer and memory 16, through appropriate stored program instructions, to become aware of the condition of the switch 200 and to take alternative action.

As also shown in FIG. 10, there is provided a one bit latch 202 comprised of one-half of an SN 7474 IC component to retain the advance/backup incremental movement status intended for the platen 20'. The latch 202 is set in the forward direction by execution of the instruction set platen forward (Y=1, S=7, A=6) and set in the reverse direction by execution of the instruction SET PLATEN BACKWARD (Y=1, X=7, A=7). The values in the latch 202 can be determined by the computer and memory 16 upon execution of instruction LOAD STATUS 2 (Y=0, X=0, A=11).

Thus, suitable digital control signals for controlling movement of the platen 20' in both the conventional one line at a time forward direction, as well as in incremental forward and reverse directions are generated in the computer and memory 16 and controlled by the appropriate platen logic and drivers to provide the desired digital movement of the platen. Additionally, appropriate condition signals for establishing various conditions associated with platen movement are generated and fed into the computer and memory 16.

Print Wire Solenoids 24'

Figure 13:
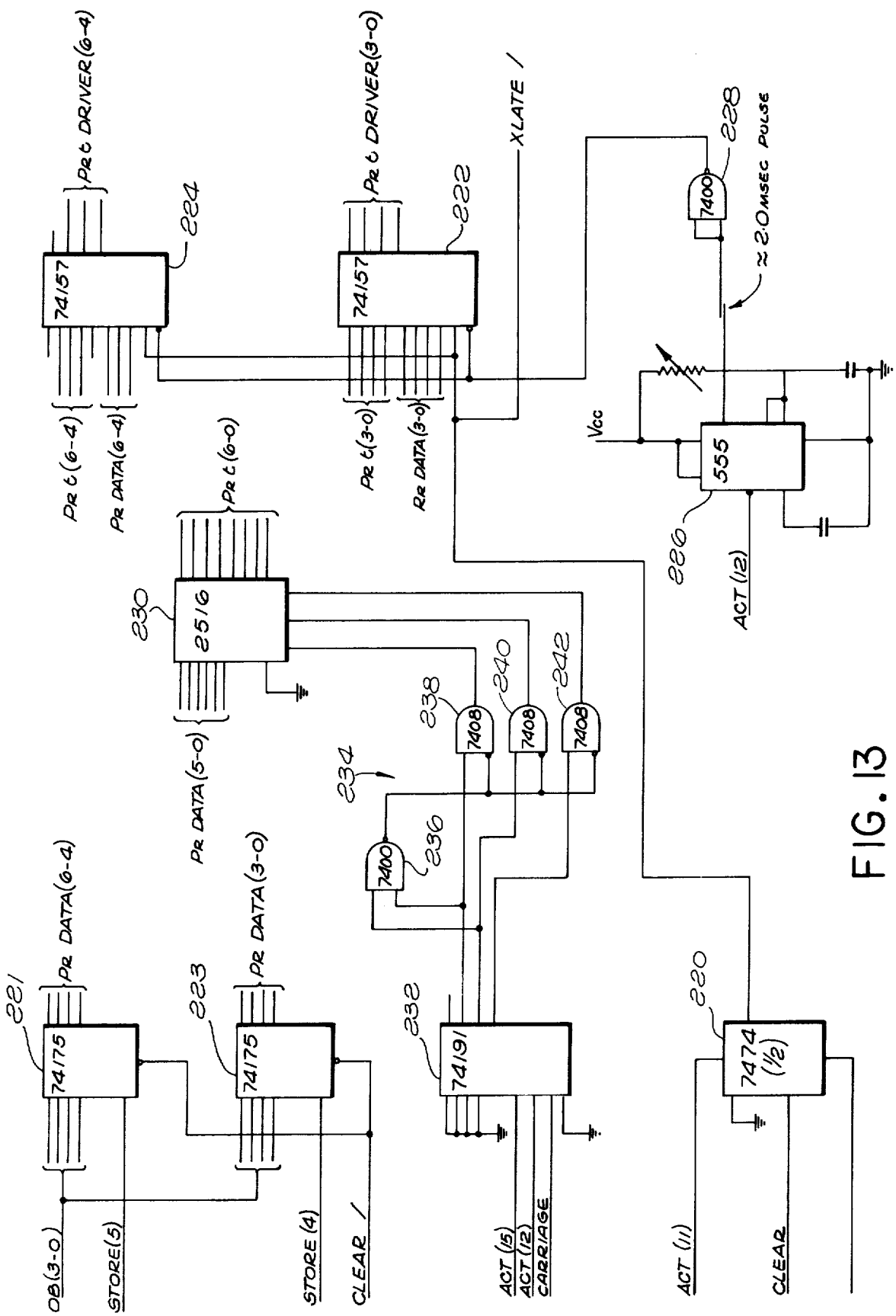
FIG. 13 is a schematic diagram of the print logic useful for the print heads in the practice of the present invention.

As noted above, the print head generally designated 24 is comprised, in this embodiment, of a plurality of seven print wires which are solenoid actuated and aligned in a vertical array. The electronic circuitry for selecting which, if any, of the print solenoids are activated at each step is illustrated in the schematic diagram of FIG. 13. The output signal of the computer and memory 16 represents either an ASCII character to be printed or, alternatively, seven data bits to be printed. That is, it may be a standard character form in alphanumeric notation or any desired correspondence between the noncharacterization of the input signal and a preselected corresponding output signal. The output signal of the computer and memory 16 is captured and retained by quadlatch 223 (print data 3-0) by execution of the instruction STORE PRINT REGISTER LOWER (Y=1, X=6, A=4) and by quadlatch 22 (print data 6-4) by execution of the instruction STORE PRINT REGISTER UPPER (Y=1, X=6, A=5).

For direct (that is, untranslated) printing, latch 220, which comprises one-half of an SN 7474 IC component has been set (that is, high output) by execution of instruction SET DIRECT PRINTING (Y=1, X=7, A=11). This conditions two line to one line selectors 222 and 224 which may be SN 74157 IC components to pass to the output thereof (print driver (6-0)), the data bits retained in quad latches 221 and 223 upon activation by execution of instruction, PRINT (Y=1, X=7, A=12) which activates the one shot circuit 226 which, for example, may be a SIGNETICS NE555 or equivalent, which produces approximately a two millisecond output pulse, and this output pulse is inverted by gate 228 and strobes input to output for the 2 millisecond period.

For each output of two line to one line selectors 222 and 224 which is high, this high signal is amplified by power Darlington transistors (not shown) located on the carriage and the output of the amplified signal from the power Darlington transistors is applied to the individual print wire solenoids 24'. Application of the current to the solenoids selectively activates the solenoids to drive the respective print wires forward thereby pressing the inked ribbon against the printout medium and thus prints a dot.

It will be appreciated, of course, that the above mentioned sequence of operations occurs as directed by the computer and memory 16 during or at the end of each incremental step of the carriage 18 since the print head 24 and print wire solenoids 24' are mounted on the print head for movement therewith. Therefore, there is provided a predetermined pattern of dots in a horizontally spaced array and depending upon which print solenoids 24' are activated during or at the end of each incremental step, it can be seen that such a predetermined dot pattern array is provided in response to the known input signal.

For translated printing, that is printing in which, for example, alpha-numeric characters are to be provided on the printout medium in response to the known input signal, latch 220 is reset (low output) by execution of the instruction SET XLATE PRINTING (Y=1, X=7, A=10). This conditions the two line to one line selectors 222 and 224 to pass to their output signals (print drivers per (6-0)), the output data of the read only memory 230, which may be a Signetics 2516-CM2150 or equivalent for one strobe as in the direct printing described above.

The read only memory 230 stores the individual dot patterns (7 dots high, five incremental steps of the carriage 18) for each printable ASCII character (63 characters plus space). The character to be printed from the read only memory 230 is selected by the output of quad latches 223 and 221 PRINT DATA (5-0) and the output of up/down counter 232 which may be an SN 74191 IC component. The output PRINT DATA (5-0) is controlled by the gating circuits 234 comprised of gates 236, which may be an SN 7400 IC component, and gates 238, 240 and 242 which may be SN 7408 IC components. The output of the gating circuit modifies the normal output in accordance with the following table:

| Value of Output Signal From Counter 232 | Value of Output Signal of Gating Circuit 234 |
|---|---|
| 0 | 0 |
| 1 | 1 |
| 2 | 2 |
| 3 | 3 |
| 4 | 4 |
| 5 | 5 |
| 6 | 0 |
| 7 | 0 |

For illustration, the up/down counter 232 is cleared by execution of instruction XLATE COUNTER RESET (Y=1, X=7, A=15) to 0 and the particular ASCII character has been placed in quad latches 221 and 223. Printing is set in the forward direction by execution of instruction SET CARRIAGE FORWARD (Y=1, X=7, A=4). By execution of instruction PRINT (Y=1, X=7, A=12) up/down counter 232 is caused to count up and its output will be the value one. This value is applied to read only memory 230 and the read only memory 230 selsects the first column of the already preselected ASCII character which is available as the output of the read only memory 230 and also is input to the two line to one line selectors 222 and 224. By execution of the instruction PRINT (Y=1, X=7, A=12), one shot circuit 226 produces the above described output pulse for the above described approximately 2 milliseconds which causes printing by the print solenoids 24', as described above.

Action of the computer and memory 16 causes the carriage 18 to advance. By execution of instruction PRINT (Y=1, X=7, A=12) a like process to that described above is repeated except that up/down counter 232 contains the value two and the dots provided by the print solenoids 24' are printed representing the second column of the selected ASCII character. This process is then repeated for a total of seven times for each character. However, for output values of the up-down counter 232 of six and seven, the output of gating circuitry 234 is zero and therefore the output of the read only memory 230 is also zero. This produces no printing for these two columns when the output values of the up/down counter 232 are six and seven. The absence of the printing provided by the pring solenoids 24' provides the spacing between adjacent characters. Thus, there is provided a single character defined by the seven high dot matrix seven steps wide.

For the condition of the carriage 18 moving backward that is, from left to right, by execution of the instruction SET CARRIGE BACKWARD (Y=1, X=7, A=5), up/down counter 232 counts downwardly and produces the sequential outputs 7654321. For such a mode of operation, with the carriage being incrementally stepped from left to right, no printing occurs for the value 7 and 6 in the up/down counter 232 output and the columns for printing will be selected from the read only memory 230 in reverse order. Therefore, the printout arrangement according to the present invention has the capability of printing out in alphanumeric from the particular characters whether the carriage is moving from left to right or right to left. That is, regardless of the direction of movement of the carriage, the correct character format will be provided for a given input signal.

Margin Control

According to the principles of the present invention, there is incorporated in the printout arrangement 10 suitable margin control structure and circuitry. Basically, the margin control sensor means are structurally mounted on a slide bar placed horizontally and parallel with the platen 20' and comprise two light emitting diodes and two photo transistors. One light emitting diode and one photo transistor comprises each of the left and right margin controls. The combination of a light emitting diode and phototransistor may, for example, be a TI L138 (Source and Sensor Assembly), or equivalent. The circuitry shown in FIG. 14 in which a left margin source and sensor assembly 250 is comprised of a light emitting diode 252 and the corresponding phototransistor 254. Similarly, the right margin control is comprised of light emitting diode 256 and corresponding phototransistor 258. It will be appreciated, of course, that the left margin control and right margin control, according to this embodiment of the present invention, are carriage 18 sensors in that the margin control is provided by signals generated in response to a particular position of the carriage 18.

For the condition of the light path between the light emitting diode 252 and phototransistor 254 interrupted, the output of S-R latch 260 is held high. Similarly, if the light passed between the photoemitting diode 256 and corresponding phototransistor 258 is interrupted, the output of the S-R latch 260 is held low. S-R latch 260 may also be caused to be set low by execution of the instruction MARGIN LATCH RESET (Y=1, X=7, A=3).

Structurally, there is mounted on the incremental carriage 18 an opaque light shield positioned so that as the carriage moves from right to left and approaches the position of the left margin sensor 250, the light shield interrupts the light path between the photo emitting diode 250 and corresponding photo transistor 254. Similarly, as the incremental carriage 18 moves from left to right and approaches the position of the right margin control, the light path between light emitting diode 256 and corresponding phototransistor 258 is interrupted by the opague light shield. The status of the SR latch 260 is available to the computer and memory 16 by execution of the instruction LOAD STATUS 1 (Y=0, X=0, A=10). The left and right margin sensor 250 can be positioned along the slide bar upon which it is mounted by manual operation of handles which are available for the operator of the printout arrangement 10.

For standard printing of character output in the left to right direction, automatic return of the carriage from the right margin to the left margin is provided. This is achieved by the computer and memory 16 executing the instruction MARGIN LATCH RESET (Y=1, X=7, A=3), which resets the latch 260. The computer and memory 16 then causes a successive set of right to left incremental steps for movement of the incremental carriage until the SR latch 260 is set, indicating that the carrige has reached its left margin position.

Ribbon Actuator

As noted above, there is provided ribbon means 22 for providing the print ribbon between the print wire solenoid 24' in the media upon which printout is obtained. The print ribbon is of ink ribbon and consequently is moved, preferably, in a digital manner, by suitable controls generated within the computer and memory 16. As noted above, this is achieved by use of the appropriate number of ribbon solenoids. As shown in FIG. 14A, a ONE SHOT circuit 270, which may comprise a SIGNETICS NE555 or equivalent, is caused to produce a positive output pulse by execution of the instruction RIBBON FEED (Y=1, X=7, A=13). This signal is converted by gate 272, which may be an SN 7400 IC component and applied to ribbon feed circuitry which may be located on the incremental carriage 18, which circuitry is shown in FIG. 15.

Figure 15:
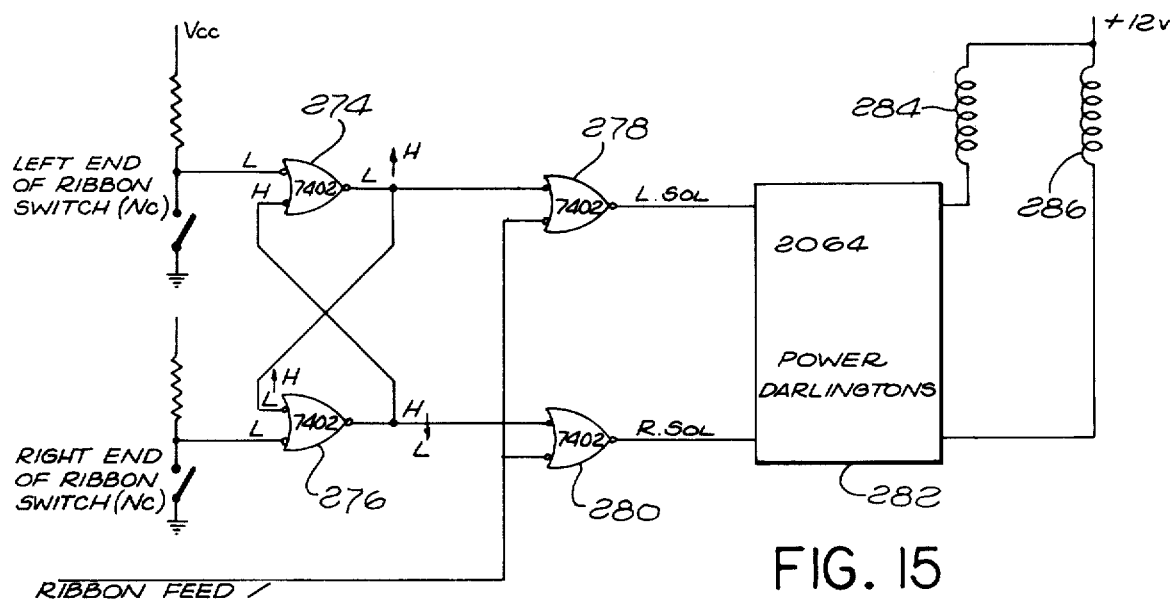

Referring to FIG. 15, one output of gates 274 and 276 is low (high) while the other is high (low). The signal RIBBON FEED is applied to gate 278 and 280. As shown on FIG. 15 gate 278 is connected to the output of gate 274 and gate 280 is connected to the output of gate 276. For the condition in which both inputs to one of the two gates 278 and 280 are low, there is produced a positive output which is amplified by power Darlington transistors 282 and the output of the power Darlington transistors 282 is applied to one of the solenoids 284 and 286 of the left and right ribbon feed solenoids 288 and 290. The energizing of the ribbon feed solenoids causes the ribbon to move from one of the ribbon spools to the other. Continuous incremental movement of the ribbon in one direction will, eventually, wind the ribbon onto one spool, either the left or the right, depending upon the direction of movement and thus unwind it from the other spool. A rivet may be located in the fabric of both ends of the ribbon and as the ribbon unwinds from the ribbon spool, the rivet passes through a narrow slit in a switch contact. The left end ribbon switch is designated 292 and the right end ribbon switch is designated 294 on FIG. 15. As shown thereon, opening of the switches 292 or 294 changes the status of gates 274 and 276 and thus directs the signal ribbon feed/signal to the other ribbon solenoid from which it is then apllied. As a consequence, successive execution of instruction RIBBON FEED (Y=1, X=7, A=13) will energize one of the ribbon solenoids without energizing the other until the ribbon has completely unwound to the point at which the ribbon rivet actuates the ribbon switch either 292 or 294, at which point the other solenoid will be energized. Energizing of the other solenoid winds the ribbon in the opposite direction. Thus, the ribbon is digitally moved for alternate winding and rewinding across the face of the printout medium.

General Purpose Timer

The timer 291 (SIGNETICS NE555) and associated components (not shown) sets one bit latch 293, ½ of an SN 7474 IC component, for each timing pulse to provide a timed signal selected by the computer and memory 16 for utilization, for example, of time dependent functions. This signal may be one input signal of an SN 74125 IC component as shown on FIG. 4. Similarly, one bit latches 295, (also shown on FIG. 7) and 297, each comprising ½ of an SN 7474 IC component, provide keyboard and carriage signals, respectively, as input signals such as shown on FIG. 4. One bit latches 299, 301 and 303 are utilized for temporary storage and retention of certain one bit binary variables associated with certain computer memory 16 functions.

Converters

As noted above, there is provided a serial-by-bit to parallel-by-character data converter 14 for receiving the input signal and for transmitting a coded output signal in response thereto to the electronic computer and memory 16. Similarly, in certain embodiments of the present invention wherein there is provided a keyboard and logic 26, as discussed above in connection with FIG. 6, there is also provided a parallel-by-character to serial-by-bit data converter 28 for generating an output signal in communications line 30 for transmission to regions remote the printing arrangement 10 shown in FIG. 1.

Figure 16:
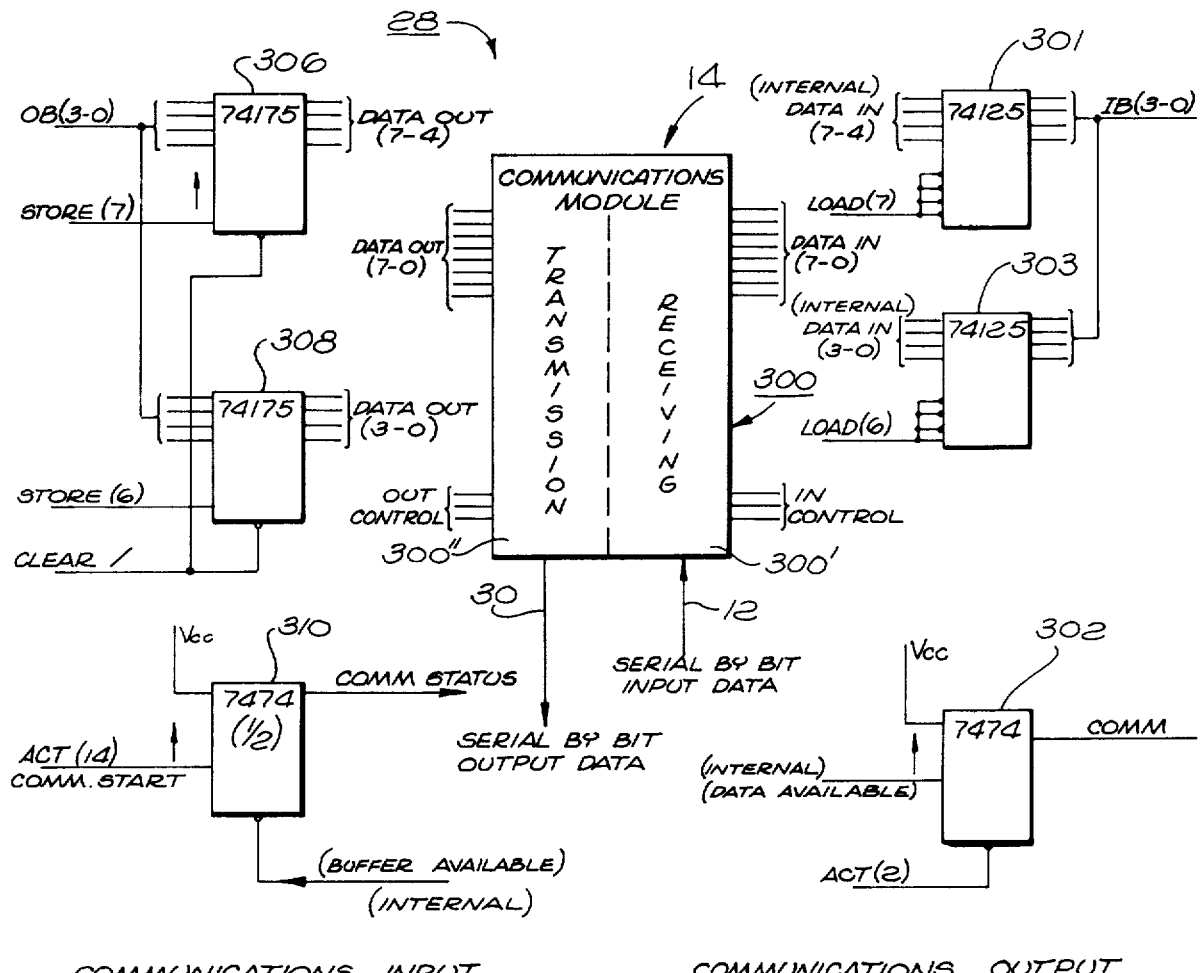
FIG. 16 is a schematic diagram of a converter useful in the practice of the present invention.

As shown in FIG. 16, a serial-by-bit to parallel-by-character data converter 14, and the associated control circuitry, is provided to process and convert incoming asynchronous serial-by-bit data to a parallel-by-character data before it is acted upon by the computer and memory 16. The conversion process (serial-by-bit to parallel-by-character) is well known in the art. Commercially available integrated circuits of the MOS or CMOS variety are capable of performing all necessary logic and data transmission functions associated therewith. As shown in FIG. 16, the serial-by-bit data is received by the receiving section 300' of the communications module 300 which incorporates the logic end circuitry as well as suitable interconnections for both the serial-by-bit to parallel-by-character data converter 14 and the parallel-by-character to serial-by-bit data converter 28. A communication module makes the serial-by-bit input data available in parallel form as signals DATA IN (7-0). When a complete character has been received, latch 302 comprising one-half of an SN 7474 IC component is set. The latch 302 output is available to the computer and memory 16 by execution of instruction LOAD STATUS ONE (Y=0, X=0, A=10). Upon detection of the change in the condition of the latch 302 output by the computer and memory 16 the data character is available to be read by execution of the instruction LOAD COMMUNICATIONS REGISTER LOWER (3-0), (Y=1, X=0, A=6) for bits 3, 2, 1 and 0; and by execution of instruction LOAD COMMUNICATIONS REGISTER UPPER (7-4), (Y=0, X=0, A=7) for bits 7, 6, 5 and 4. The gates 301 and 303 (SN 74125 IC component) gate the data signals from the communications module 14 into the IC 40 (FIG. 4). After transfer of the character to the computer and memory 16, latch 302 is reset by execution of the instruction COMMUNICATION LATCH RESET (Y=1, X=7, A=2). This sequence of operations is continued for the information contained within the coded information signal received in the serial-by-bit input data, as indicated at 12.

Similarly, the components for the parallel-by-character to serial-by-bit converter 28 and associated control circuitry and logic are commercially available integrated circuits of the MOS or CMOS variety and are capable of performing all of the necessary logic and data transmission functions associated therewith. The conversion process of parallel-by-character to serial-by-bit is also well known in the prior art.

As shown in FIG. 16, quad latch 306 and 308 which may be similar to quad latch 42 described above, receive and retain the output of the computer and memory 16 by execution of instruction STORE COMMUNICATION REGISTER LOWER (3-0), (Y=1, X=6, A=6) representing bits 3, 2, 1 and 0 of the parallel format data character. Quad latch 308 receives and retains the output of the computer and memory 16 by execution of instruction STORE COMMUNICATION REGISTER UPPER (7-4) (Y=1, X=6, A=7), representing bits 7, 6, 5, and 4 of the parallel format data character. By execution of instruction COMMUNICATION START (Y=1, X=7, A=14) latch 310, which may be one-half of an SN 7474 IC component is set transferring the data character of quad latches 306 and 308 to the transmission section 300" of the communications module 300 and initiating the conversion to a serial-by-bit asynchronous format. Upon completion of the conversion sequences, the transmission section of 300" of the communications module 300 resets latch 310. The latch 310 output is available to the computer and memory 16 by execution of instruction LOAD STATUS TWO (Y=0, X=0, A=11). The change in status (for example, set to reset and reverse), off latch 310 caused by completion of a character conversion, allows the computer and memory 16 to synchronize itself with the conversion process.

This concludes the description of the preferred embodiments of the present invention. Thus, those skilled in the art may find variations and adaptations thereof and the appended claims are intended to cover all such variations and adaptations falling within the true scope and spirit thereof.

I claim:

1. In a printout arrangement for providing a predetermined printout on a medium in response to a known first coded information signal, the improvement comprising, in combination:

a platen means for incremental, digital rotational movement adjacent said medium to move said medium in first directions;

platen drive means operatively connected to said platen means for selectively moving said platen in response to a platen control signal;

carriage means adjacent said medium for digital incremental reciprocating motion in second directions different from said first directions;

carriage drive means operatively connected to said carriage means for driving said carriage in said second directions in response to a carriage drive signal, and said carriage drive means comprising means for providing magnetic forces for interaction between said carriage drive means and said carriage to provide said digital incremental reciprocating motion thereof, and said carriage means being free of mechanical interconnection to said carriage drive means;

a print head means mounted on said carriage means for movement therewith, for printing predetermined sequential patterns on the medium;

print head control means operatively connected to said print head for controlling said predetermined sequential patterns of printing in response to a print control signal;

ribbon means mounted for digital, incremental movement intermediate said print head and said medium;

ribbon drive means operatively connected to said ribbon for selectively moving said ribbon in response to a ribbon control signal;

data converter means for receiving said first coded informaton signal and converting said first coded information signal to a second coded information signal different from said first coded information signal;

microprocessor means for receiving said second coded information signal and generating said platen control signal, said carriage control signal, said print control signal and said ribbon control signal in response to said second coded information signal in an interrelated predetermined timed sequence to provide said sequential patterns of printing in predetermined locations on said medium.

2. The arrangement defined in claim 1 wherein:
said known first coded information signal is a serial by bit information signal and said second coded information signal is a parallel by character information signal.

3. The arrangement defined in claim 1 wherein:
said data converter means is in a memory section means of said microprocessor means and said second coded information signal is generated by a predetermined program in said memory section means in response to said first coded information signal.

4. The arrangement defined in claim 1 and further comprising:
platen position detection means for detecting a relative position of said platen and generating a platen position signal corresponding thereto, for transmission to said microprocessor means, and said platen control signal responsive to said platen position signal.

5. The arrangement defined in claim 1 and further comprising:
carriage position detection means for detecting the relative position of said carriage with respect to said medium and generating a carriage position signal corresponding thereto for transmission to said microprocessor means and said carriage control signal responsive to said carriage position signal.

6. The arrangement defined in claim 1 wherein:
said carriage drive means further comprises:
a track means comprising a linear array of spaced apart magnetic bar means in a predetermined spaced array;
a predetermined plurality of magnetic means mounted on said carriage means and in magnetic field interaction relationship to said track means, whereby selectively changing the polarity of said plurality of magnetic means on said carriage means with respect to the polarity of the plurality of magnetic bar means on said track means move said carriage means in said second directions.

7. The arrangement defined in claim 1 wherein said print head further comprises:
a dot printer comprising a plurality of selectively operable wire dot printers aligned in a predetermined spaced array.

8. The arrangement defined in claim 7 wherein said dot printer further comprises:
seven dot printers aligned in a direction substantially parallel to said first directions.

9. The arrangement defined in claim 1 and further comprising:
a key board for selectively generating a plurality of discrete, separate key board signals in response to selective operation of said keyboard means;
said microprocessor means further comprising:
keyboard signal input terminal means for receiving said keyboard signals;
second data converter means connected to said keyboard signal input terminal for converting said keyboard signals into a third coded information signal;
output terminal means for receiving said third coded information signal and transmitting same to regions external said printout arrangement.

10. The arragement defined in claim 9 wherein:
said first coded information signal and said third coded information signals are serial by bit coded signals.

11. The arrangement defined in claim 9 wherein said microprocessor means further comprises:
means for receiving said third coded information signal and generating said platen control signal, said carriage control signal, said print control signal and said ribbon control signal in response to said third coded information signal.

12. The arrangement defined in claim 11 wherein said first coded information signal and said third coded information signal are serial by bit information signals and said second coded information signal is a parallel by character information signal.

13. The arrangement defined in claim 12 and further comprising:
platen position detecting means for detecting the position of said platen means and generating a platen position signal corresponding thereto for transmission to said microprocessor means and said platen control signal responsive to said platen position signal.

14. The arrangement defined in claim 12 and further comprising:
carriage position detection means for detecting the relative position of said carriage with respect to said medium and generating a carriage position signal corresponding thereto for transmission to said microprocessor means and said carriage control signal responsive to said carriage position signal.

15. The arrangement defined in claim 9 wherein said carriage drive means further comprises:
a track means comprising a linear array of spaced apart magnetic bar means in a predetermined spaced array;
a predetermined plurality of magnetic means mounted on said carriage means and in magnetic field interaction relationship to said track means, whereby selectively changing the polarity of said plurality of magnetic means on said carriage means with respect to the polarity of the plurality of magnetic bar means on said track means move said carriage means in said second direction.

16. The arrangement defined in claim 6 and further comprising:
platen position detection means for detecting the position of said platen and generating a platen position signal corresponding thereto for transmission to said microprocessor means and said platen control signal responsive to said platen position signal;
carriage position detection means for detecting the relative position of said carriage with respect to said medium and generating a carriage position signal corresponding thereto for transmission to said microprocessor means and said carriage control signal responsive to said carriage position signal.

17. The arrangement defined in claim 15 and further comprising:
platen position detection means for detecting the position of said platen and generating a platen position signal corresponding thereto for transmission to said microprocessor means and said platen control signal responsive to said platen position signal;

carriage position detection means for detecting the relative position of said carriage with respect to said medium and generating a carriage position signal corresponding thereto for transmission to said microprocessor means and said carriage control signal responsive to said carriage position signal.

18. The arrangement defined in claim 17 wherein said print head further comprises:
 a dot printer comprising a plurality of selectively operable wire dot printers aligned in a predetermined spaced array.

* * * * *